United States Patent
Koshika et al.

(10) Patent No.: US 8,184,309 B2
(45) Date of Patent: May 22, 2012

(54) PRINTING SYSTEM AND JOB PROCESSING METHOD WITH INHIBITION AND DESIGNATION OF FUNCTION AND DELETION OF ASSOCIATED JOBS

(75) Inventors: Takashi Koshika, Tokyo (JP); Takeshi Utsunomiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 886 days.

(21) Appl. No.: 11/971,672

(22) Filed: Jan. 9, 2008

(65) Prior Publication Data

US 2008/0170259 A1 Jul. 17, 2008

(30) Foreign Application Priority Data

Jan. 15, 2007 (JP) .................. 2007-006423

(51) Int. Cl.
*G06K 15/00* (2006.01)
*H04N 1/40* (2006.01)
*H04N 1/32* (2006.01)
(52) U.S. Cl. .............. 358/1.14; 358/442; 358/444
(58) Field of Classification Search ............ 358/1.1, 358/1.14, 1.15, 1.9, 2.1, 471, 404, 400, 444, 358/1.18, 1.16, 442
See application file for complete search history.

(56) References Cited

U.S. PATENT DOCUMENTS

2002/0118383 A1* 8/2002 Kamiya ................ 358/1.13
2002/0159078 A1* 10/2002 Akiyama ................ 358/1.1
2004/0012812 A1* 1/2004 Shimizu ................ 358/1.15
2005/0270557 A1* 12/2005 Ookuma ................ 358/1.13
2007/0035791 A1* 2/2007 Shimura ................ 358/538
2008/0170259 A1* 7/2008 Koshika et al. ......... 358/1.15
2010/0067032 A1* 3/2010 Sugahara et al. ........ 358/1.13

FOREIGN PATENT DOCUMENTS

JP 2005-165722 6/2005

* cited by examiner

*Primary Examiner* — Jerome Grant, II
(74) *Attorney, Agent, or Firm* — Cowan, Liebowitz & Latman, P.C.

(57) ABSTRACT

This invention can cope with various user needs and use cases related to a holding function and can prevent any situation in which, for example, even when the holding function is disabled, an external device continuously inputs, to a printing apparatus, jobs which require use of the holding function. This invention also prevents the data of a job that requires use of the holding function from remaining in a memory when the holding function is disabled. This invention prevents data that will never be used from remaining in a storage area when the holding function is disabled. A printing system, according to the invention, enables a printing unit to execute a process of a job that requires use of the holding function of causing a storage unit to hold data of a job to be processed. The printing system includes a control unit which disables the holding function. If it is determined that the holding function is disabled, the control unit cancels execution, by the printing unit, of the process of the job that requires use of the holding function.

8 Claims, 33 Drawing Sheets

HOLD TAB

HOLD JOB LIST

| ACCEPTANCE NUMBER | DOCUMENT NAME | USER NAME | STATUS |
|---|---|---|---|
| 001 | DOCUMENT 1 | USER 1 | HELD |
| 002 | DOCUMENT 2 | USER 2 | HELD |
| 003 | DOCUMENT 3 | USER 3 | HELD |

PREVIEW | TEST PRINT | PRINT | ERASE | EDIT

ACTIVE JOB LIST

FIG. 12B

HOLD TAB

ACTIVE JOB LIST

| ACCEPTANCE NUMBER | DOCUMENT NAME | USER NAME | STATUS | PREDICTED TIME |
|---|---|---|---|---|
| 123 | DOCUMENT 99 | USER 99 | PRINT | 10 MINUTE |
| 124 | DOCUMENT 98 | USER 98 | STANDBY | 20 MINUTE |
| 125 | DOCUMENT 3 | USER 3 | STANDBY | 30 MINUTE |

PRIORITY PRINT | STOP | ADVANCED SETTINGS | PAUSE

HOLD JOB LIST

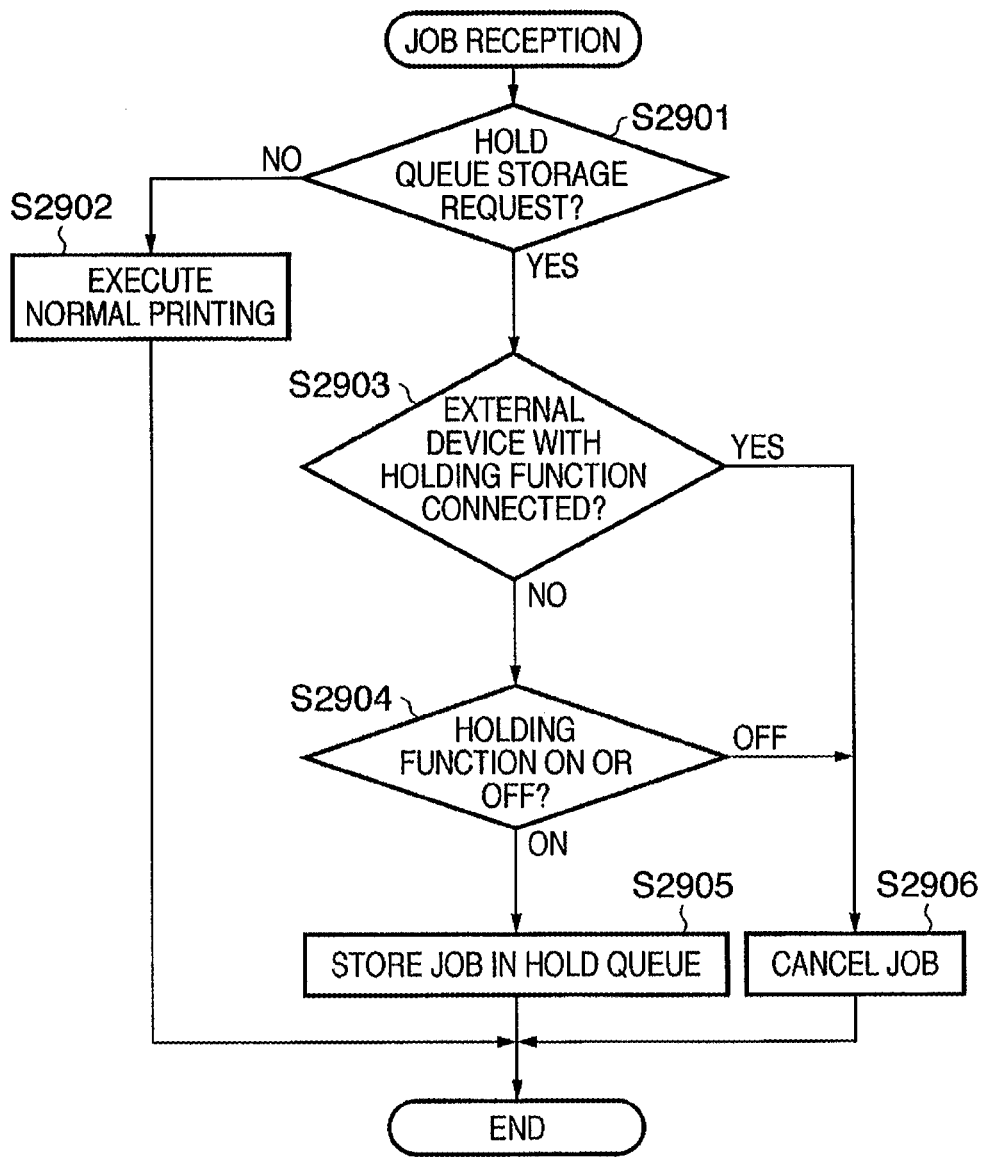

FIG. 30

| | COPY | BOX | SEND / FAX | HOLD |
|---|---|---|---|---|

■ HOLD JOB LIST  NUMBER OF SELECTED JOBS : 0/12

| | JOB NAME | USER NAME | DATE AND TIME | | | SPLIT WINDOW ▶ |
|---|---|---|---|---|---|---|
| ✓ | | | | | | ☐ DISPLAY FOR ONLY SELECTING USER |
| 📄 | 20060317091700 | user_name | 03/17 09:17 | | | ☐ ADVANCED SETTINGS / CHANGE ▲ |
| 📄 | 20060321133124 | user_name | 03/21 13:31 | ◁ | 1/2 ▶ | ☐ SELECT ALL (1 TO 100) |
| 📄 | 20060406192225 | user_name | 04/06 19:22 | | | ☐ DELETE AFTER PRINT |
| 📄 | 20060406192237 | user_name | 04/06 19:22 | | | START PRINT |
| 📄 | 20060406192244 | user_name | 04/06 19:22 | | | |
| 📄 | 20060406192251 | user_name | 04/06 19:22 | | | |

■ PRINT JOB LIST  TOTAL WAIT TIME : ABOUT...MIN

| ACCEPTANCE NUMBER | TIME | JOB NAME | STATUS | WAIT TIME (ABOUT) | | |
|---|---|---|---|---|---|---|
| | | | | | ◁ 1/1 ▷ | ADVANCED SETTINGS / CHANGE ▲ |
| | | | | | | STOP |

☐ SYSTEM STATUS / STOP ▲

PRINTING SYSTEM AND JOB PROCESSING METHOD WITH INHIBITION AND DESIGNATION OF FUNCTION AND DELETION OF ASSOCIATED JOBS

BACKGROUND OF THE INVENTION

1. Field of the Invention

The present invention relates to a technique of allowing a printing apparatus to process a job which requires use of a holding function of holding job data to be processed in a storage unit.

2. Description of the Related Art

To commercialize a printing system or printing apparatus adaptable to a print environment such as a POD (Print On Demand) market, a job holding function to be included in such a system or apparatus has been examined now. This function holds, in a memory, job data to be printed and makes it printable in response to a request from an operator.

That is, approaches to commercialize a printing system or printing apparatus adaptable to a print environment such as a POD market have currently been underway (for example, Japanese Patent Laid-Open No. 2005-165722). The following studies have also been conducted to cope with use cases assumed in a print environment such as a POD market.

For example, a print shop that represents the customers of a printing system or printing apparatus adaptable to a print environment such as a POD environment can have a need for using a printing apparatus without using the job holding function. In this case, a need for disabling the function of the printing apparatus is expected. That is, in making approaches to commercialize a printing system or printing apparatus adaptable to a print environment such as a POD market, how to meet user needs or cope with user cases expected in the further has been examined.

However, in the course of above-described examinations, the following problems newly arise. For example, a printing apparatus having the job holding function can be adapted to allow an external device capable of data communication with the printing apparatus to input, to the apparatus, job data which requires use of the job holding function. In this case, even when the job holding function is disabled on the printing apparatus side, the external device can continuously input, to the printing apparatus, jobs which require use of the job holding function without any hindrance.

Assume that as a solution to this problem, for example, the printing apparatus is adapted to restrict printing itself of the job data which requires use of the job holding function when the function is disabled. Even with this arrangement, however, the job data which requires use of the job holding function remains in the memory, and this new problem may remain unsolved.

As another possible problem of the holding function, if a job is already stored, and the holding function is disabled in this state, the data that will never be used remains in the storage unit.

As described above, for example, even if the holding function is disabled on the printing apparatus, it may be impossible to place restrictions on the external device side. At this time, on the printing apparatus side where the holding function is disabled, display related to the holding function is turned off on the operation window. However, the external device such as a computer may successively save the print data of hold jobs which require use of the holding function in, for example, a memory of the printing apparatus to be used in the holding function without knowing the situation on the printing apparatus side.

As described above, to commercialize a printing system or printing apparatus adaptable to a print environment such as a POD market, of the job holding function to be included in the system or apparatus have been examined, though there is room for further study. Additionally, the storage area may be wasted.

SUMMARY OF THE INVENTION

To solve the above-described problem of the wasted storage area, the present invention is characterized by comprising means for deleting a job for a holding function, which is stored in a storage area, and selection means for selecting whether to delete the job for the holding function from the storage area when the holding function is disabled.

To solve the problem of double holding functions when a specific external device is connected, when a specific external device is connected, the user interface of the holding function is erased from the display unit of the image forming apparatus, thereby inhibiting a user from executing an operation. When a job requiring the holding function is received, the job is canceled.

The holding function is common to the BOX function in many points in terms of functions. To implement the above-described solutions more conveniently for the user, the holding function can be enabled/disabled independently of the BOX function.

The present invention can cope with various user needs and use cases related to the holding function in the future, including the problems assumed in the prior art. The present invention can also prevent any situation in which, for example, even when the holding function is disabled, an external device continuously inputs, to a printing apparatus, jobs which require use of the holding function. The present invention can also prevent, for example, the data of a job that requires use of the holding function from remaining in a memory when the holding function is disabled. The present invention can also prevent, for example, data that will never be used from remaining in a storage area when the holding function is disabled.

Additionally, the present invention can prevent the user from recognizing that a plurality of identical holding functions appear to exist. As described above, various approaches related to the holding function can be made to commercialize a printing system or printing apparatus adaptable to a print environment such as a POD market.

The present invention is further characterized by a printing apparatus having a plurality of functions, said apparatus comprising: an input unit configured to input a job; a storage unit configured to store the job inputted by said input unit; a designation unit configured to designate, in accordance with a user's instruction, a first function among the plurality of functions; a display unit configured to, if said designation unit designates the first function, display a plurality of jobs associated with the first function among jobs stored in said storage unit; a selection unit configured to, in accordance with a user's instruction, select one of the plurality of job displayed by said display unit; a execution unit configured to execute the job selected by said selection unit; an inhibition unit configured to, in accordance with a user's instruction, inhibit the designation of the first function by said designation unit; a deletion unit configured to, if said inhibition unit inhibits the designation of the first function by said designation unit, delete jobs associated with the first function among jobs stored in said storage unit.

Additionally, the invention is also characterized by a method of controlling a printing apparatus having a plurality of functions, said method comprising: inputting a job; storing the job inputted in the input step into a storage unit; designating, in accordance with a user's instruction, a first function among the plurality of functions; displaying a plurality of jobs associated with the first function among jobs stored in the storage unit if the first function is designated in the designating step; selecting, in accordance with a user's instruction, one of the plurality of jobs displayed in the displaying step; executing the job selected in the selecting step; inhibiting, in accordance with a user's instruction, the designation of the first function in the designating step; deleting jobs associated with the first function among jobs stored in the storage unit if the designation of the first function is inhibited in the inhibiting step.

Also, the invention is characterized by a computer-readable storage medium storing a computer-executable program that, when executed by a computer, causes the computer to perform the method described in the previous paragraph.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

Figures 10A, 10B, 10C, 10D:
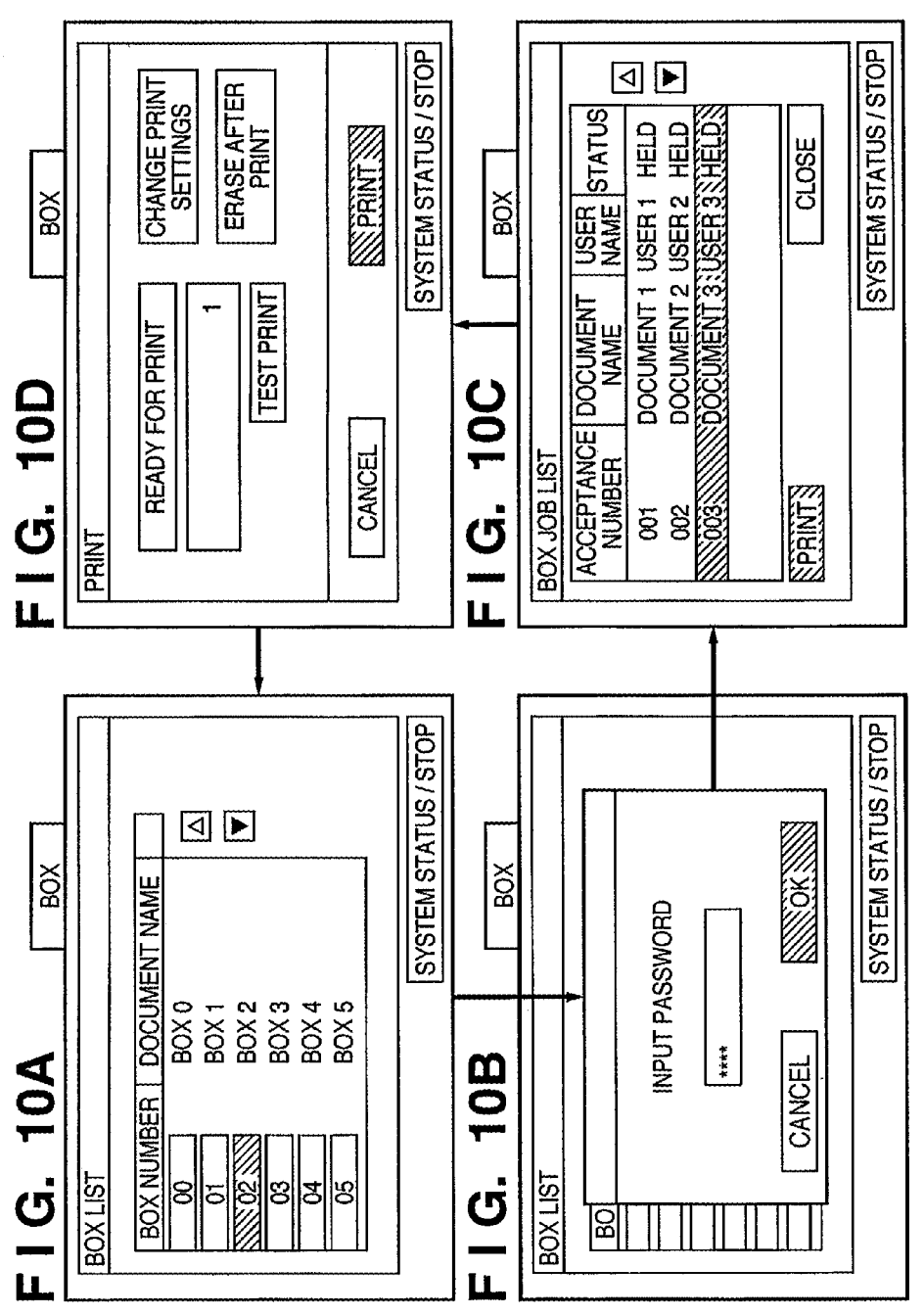

FIGS. 10A to 10D are views showing changes in the box tab window;

FIGS. 12A and 12B are views showing changes in the window when a job in the hold tab is selected;

FIG. 29 is a flowchart illustrating a hold job reception process according to the embodiment;

FIG. 30 is a view showing a display example of a touch panel portion according to another embodiment;

DESCRIPTION OF THE EMBODIMENTS

An embodiment of the present invention will be described below in detail with reference to the accompanying drawings.

Figure 1:
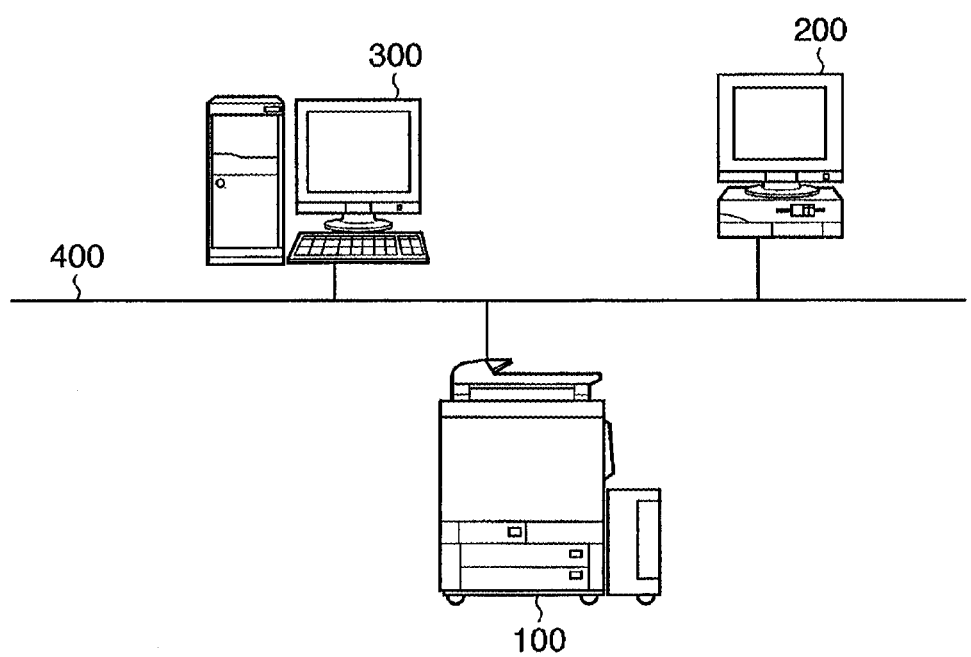
FIG. 1 is a view showing a system configuration according to an embodiment.

FIG. 1 is a view showing the fundamental constituent blocks of an entire network system according to the embodiment. As shown in FIG. 1, an MFP (Multi Function Printer or, generally, Multi Function Peripheral) 100, client PC 200, and print server 300 are connected to a network 400. In the example shown in FIG. 1, single devices are connected. However, the number of connected devices is not particularly limited, and any configuration is applicable if, at least, the image forming system (printing system) can make the MFP 100 process a print job as a process target, as in this embodiment.

The MFP 100 is an image forming apparatus (printing apparatus) which includes a scanner unit for reading an original document and a print unit for forming (printing) an image on a printing medium such as a printing paper sheet and has various functions including network scanner, network printer, and copy functions.

The client PC 200 executes various kinds of application programs in accordance with a user instruction and outputs print data to the network in response to a print request from the user. The client PC 200 also executes assistant processes such as monitoring and control of devices and jobs managed in the print server 300. A print job generated by the client PC is transferred to the MFP 100 directly or via the print server 300.

Figure 2:
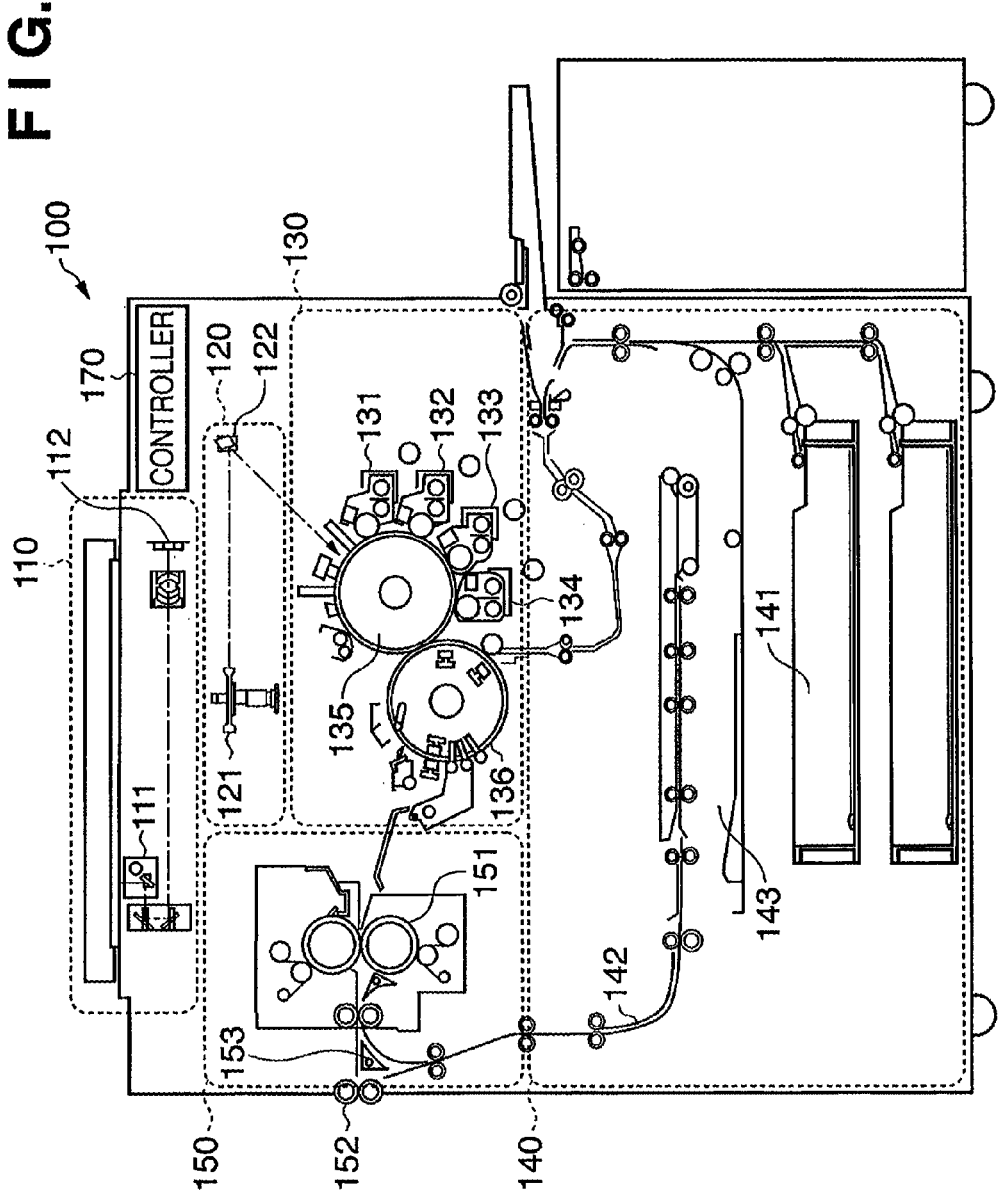
FIG. 2 is a sectional view of a multi function peripheral (MFP) according to the embodiment.

The structure of the MFP 100 will be described next with reference to FIG. 2. FIG. 2 is a sectional view of the MFP 100.

The MFP 100 comprises a scanner unit 110 which reads an image printed on a document surface, a printer unit including units 120 to 150, and a controller 170.

The controller 170 controls the overall apparatus and is mounted in the apparatus as a printed board including a microprocessor. The controller 170 executes read control of the scanner unit 110, network communication, processes corresponding to various operation contents from the user, and print processing (to be described below).

The scanner unit 110 comprises an exposure unit 111 which exposes a document surface and moves and scans on it, and a line CCD 112 which forms an image of light reflected by the document surface and converts the light into an electrical signal. The controller 170 A/D-converts a signal successively output from the line CCD 112, receives the signal as image data, and executes various processes.

The laser exposure unit 120 included in the printer unit has a polygon mirror 121 which is rotated by a motor to scan a laser beam from a laser element (not shown) driven by the controller 170, and a mirror 122 which reflects the laser beam to a photosensitive drum 135.

The image forming unit 130 rotates the photosensitive drum 135 and causes a charger to charge the surface of the photosensitive drum 135. The photosensitive drum 135 holds an electrostatic latent image on its surface as the laser exposure unit scans the laser beam. Developing units 131 to 134 having magenta (M), cyan (C), yellow (Y), and black toners form toner images by attaching the toners to the electrostatic latent image formed on the surface of the photosensitive drum 135. The toner images formed on the photosensitive drum 135 are transferred to a printing paper sheet as a printing medium. For this purpose, a transferring drum 136 which rotates together with the photosensitive drum 135 is provided. A printing paper sheet conveyed from the feed/conveyance unit 140 winds around the transferring drum 136 by the function of static electricity. The transferring drum 136 executes the step of transferring, to the printing paper sheet wound around it, the toner image of one color component formed on the photosensitive drum 135 four times, thereby forming the images of four color components on the printing paper sheet.

When the toner images of the four color components are transferred to the printing paper sheet in the above-described manner, the controller 170 peels off the printing paper sheet from the transferring drum 136 and conveys it to the fixing unit 150. The fixing unit 150 incorporates fixing rollers 151 heated by a heat source such as a halogen heater. The fixing roller 151 dissolves the toners transferred to the printing paper sheet conveyed from the image forming unit 130 and fixes the toners to the printing paper sheet by heat and pressure. Discharge rollers 152 discharge the printing paper sheet with fixed toners to an external unit (finisher unit).

The MFP 100 of the embodiment can perform double-sided printing. A printing paper sheet sensor is provided upstream (on the image forming unit side) of the discharge rollers 152. In the double-sided printing mode, the sensor detects the trailing edge of a printing paper sheet. At this time, the controller 170 pivotally rotates a flapper 153 by a predetermined angle and reverses the rotational directions of the discharge rollers 152 so that the printing paper sheet is turned over and conveyed to a double-sided feeding path 142 in the feed/conveyance unit 140.

The feed/conveyance unit 140 has a sheet storage 143 for double-sided printing, which stores printed paper sheets on one surface near the double-sided feeding path 142. The feed/conveyance unit 140 also has at least one sheet storage 141 represented by a sheet cassette or paper deck. In accordance with an instruction from the controller 170, one of the plurality of sheets stored in the sheet storage 141 or 143 is separated and conveyed to the image forming unit 130 and fixing unit 150.

The arrangement of the controller 170 of the MFP 100 according to the embodiment will be described next with reference to FIG. 3.

The controller 170 of the MFP 100 has an MFP controller 1000 including a microprocessor and memories to store process programs. The MFP controller 1000 performs traffic control to, for example, temporarily save image data in accordance with the purpose of the MFP or decide the data path between various processing units to be described below.

The controller 170 comprises a hard disk (to be referred to as an HDD hereinafter) 1500 that is a mass storage device capable of storing the data of a plurality of jobs. Not the hard disk but any other mass storage device random-accessible is usable.

The MFP controller 1000 implements a plurality of functions such as a process of copying job data output from the scanner and print processing based on job data output from the client PC on the network by using the HDD 1500 as a buffer.

The MFP 100 is a full-color device or monochrome device. The basic constituent elements of full-color and monochrome devices are the same except color processes and internal data. The full-color device includes the arrangement of the monochrome device. Hence, the full-color device will mainly be described herein, and a description of the monochrome device will additionally be made as needed.

Figure 3:
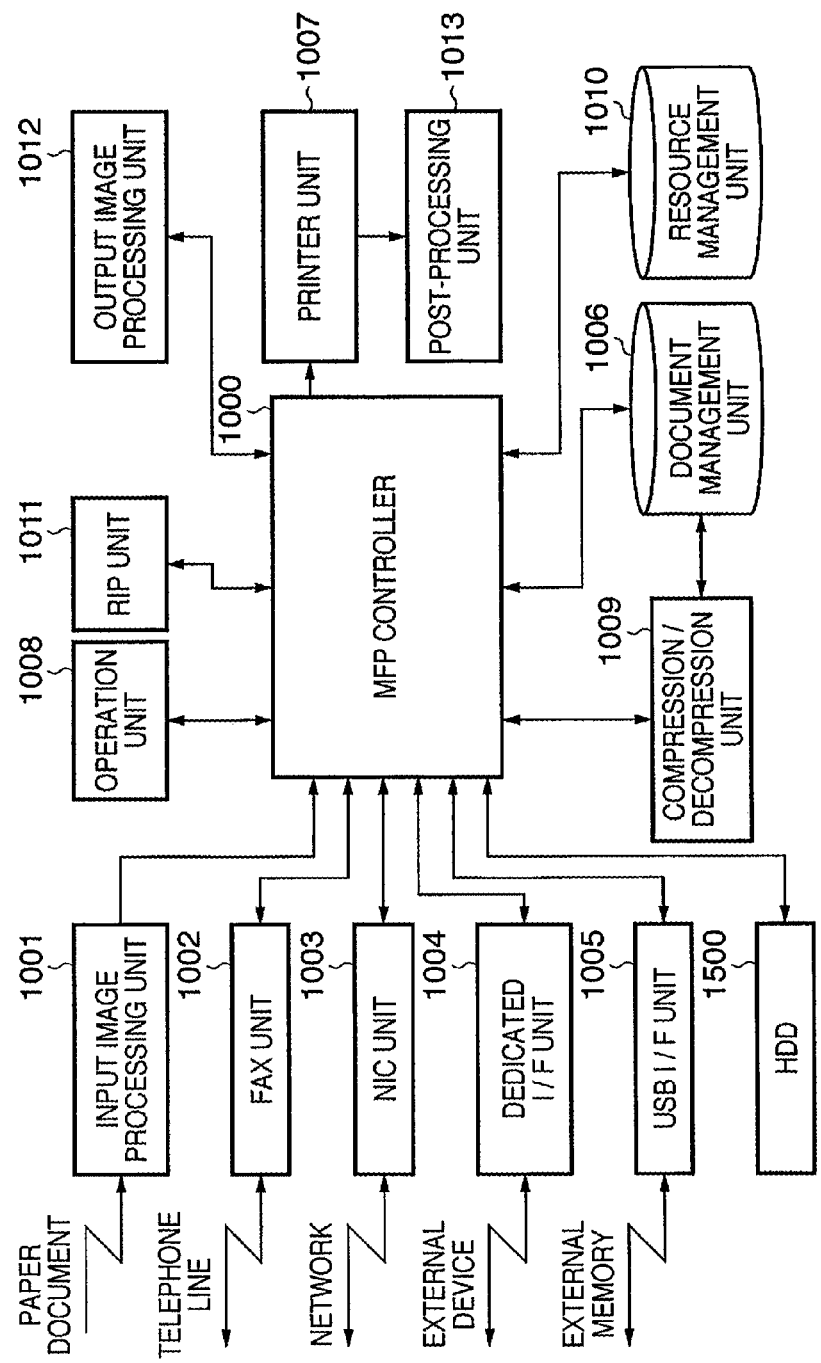
FIG. 3 is a block diagram showing a detailed arrangement of the controller of the MFP according to the embodiment.

As shown in FIG. 3, many processing units are connected to the MFP controller 1000. An input image processing unit 1001 reads an image of, for example, a paper document and processes read image data. A FAX unit 1002 executes image transmission/reception using a telephone line represented by facsimile. An NIC (Network Interface Card) unit 1003 transmits or receives image data or device information by using a network. A dedicated interface 1004 exchanges information such as image data with an external device. A USB (Universal Serial Bus) interface unit 1005 transmits/receives image data or the like to/from a USB device represented by a USB memory (a kind of removable medium).

Under the control of the MFP controller 1000, a document management unit 1006 stores, in the HDD 1500, image data from the input image processing unit 1001, image data of facsimile jobs input via the FAX unit 1002, image data input from an external device such as a computer via the NIC unit 1003, and various kinds of image data input via the dedicated I/F unit 1004 or USB interface unit 1005. The document management unit 1006 also reads out the image data from the HDD 1500 under the control of the MFP controller 1000. The MFP controller 1000 determines the output destination of the image data read out by the document management unit 1006. When the MFP controller 1000 sets the output destination to, for example, a printer unit 1007, print processing is executed. As a result, print processing for copy, network printer, or facsimile reception can be performed. The MFP controller 1000 also transfers the image data read out from the HDD 1500 to an external device such as another computer or another image forming apparatus in accordance with an instruction input from an operation unit 1008 by the operator (worker).

In storing image data in the HDD 1500, the document management unit 1006 compresses the image data as needed. Conversely, in reading out image data compressed and stored in the HDD, the document management unit 1006 decompresses (decodes) the image data to the original size. To do this, a compression/decompression unit 1009 is provided. Upon receiving data compressed by JPEG, JBIG, or ZIP via the NIC unit 1003, the document management unit 1006 controls the compression/decompression unit 1009 to expand (decompress) it.

A resource management unit 1010 readably holds and manages fonts, color profiles, and various kinds of parameter tables such as a gamma table to be commonly handled under the control of the MFP controller 1000. The resource management unit 1010 also stores a new parameter table or corrects and updates a parameter table in response to a request from the MFP controller 1000.

A process executed when the MFP controller 1000 receives print data (PDL data) received from the NIC unit 1003 or dedicated interface 1004 will be described next.

When the MFP controller 1000 receives PDL data, a RIP (Raster Image Processor) unit 1011 executes a RIP process. The MFP controller 1000 also causes an output image processing unit 1012 to process the print target image for printing, as needed. The intermediate data of the image data generated at that time or print ready data (bitmap data for printing or data obtained by compressing it) is stored in the HDD 1500 via the document management unit 1006 as needed. The storage process in the HDD 1500 is executed asynchronously with the printer unit 1007.

On the other hand, the MFP controller 1000 reads out the image data of each page from the HDD 1500 via the document management unit 1006 and outputs the image data to the printer unit 1007 in synchronism with its print process timing. At this time, the MFP controller 1000 controls a post-processing unit 1013 in accordance with the description of the print job. The post-processing unit 1013 controls a finisher unit that executes sorting or finishing of sheets.

The process of the MFP controller 1000 according to the embodiment has been described above roughly. The MFP controller 1000 of the embodiment switches the path of image data to be processed in the following way. The MFP controller 1000 also processes intermediate data, and a description thereof will be omitted. A description of accesses except those which start and end in the document management unit 1006 will be omitted. A sequence will roughly be described by omitting processes of the compression/decompression unit 1009 and post-processing unit 1013 which are used as needed.

A) Copying function: input image processing unit→output image processing unit→printer unit B) FAX transmission function: input image processing unit→FAX unit C) FAX reception function: FAX unit→output image processing unit→printer unit D) Network scan: input image processing unit→NIC unit E) Network printing: NIC unit→RIP unit→output image processing unit→printer unit F) Scan to external device: input image processing unit→dedicated I/F unit G) Printing from external device: dedicated I/F unit→output image processing unit→printer unit H) Scan to external memory: input image processing unit→USB I/F unit I) Printing from external memory: USB I/F unit→RIP unit→output image processing unit→printer unit J) Box scan function: input image processing unit→output image processing unit→document management unit K) Box printing function: document management unit→printer unit L) Box reception function: NIC unit→RIP unit→output image processing unit→document management unit M) Box transmission function: document management unit→NIC unit N) Preview function: document management unit→operation unit In addition, combinations with various functions such as an e-mail service and Web server function are conceivable, though they will be omitted herein.

Box scan, box printing, box reception, and box transmission are the process functions of the MFP accompanying write in the HDD 1500 and read from the HDD 1500 using the document management unit 1006. "Box" indicates a box (folder or directory) provided in the HDD 1500, which is a function of causing the document management unit 1006 to temporarily save data in the HDD 1500 for each job or each user or inputting/outputting data by combining a user ID and password.

The operation unit 1008 functions as a user interface to select the above-described various functions or input an operation instruction. To provide various display menus for the user and display a preview of image data managed by the document management unit 1006, the operation unit 1008 comprises a high-resolution display device, various kinds of instruction buttons, and a touch panel. The user operates the operation unit 1008 even for copy.

The outline of the process of the MFP controller 1000 according to the embodiment will be described next with reference to FIG. 4. This process is implemented by the microprocessor included in the MFP controller 1000, the memory that stores firmware, and various processing units shown in FIG. 3.

A network interface controller 1601 controls the NIC unit 1003, analyzes a communication protocol, receives data from the host computer, and transfers the received data to a job ticket analysis unit. A job ticket analysis unit 1602 analyzes a job ticket added to print data, transmits the attribute of the job to a job controller 1600, registers the job in a management table (not shown), and stores PDL data in a reception buffer.

Upon detecting PDL data storage in the reception buffer, a PDL data analysis unit 1603 starts analyzing the PDL data. More specifically, the PDL data analysis unit 1603 reads out the PDL data stored in the reception buffer, generates an object (intermediate code) corresponding to each command, and stores the objects in an intermediate buffer. In this embodiment, the command supported by the printer is PDL (Page Description Language). The printer supports not only PDL but also any other data that allows printing of each page. The PDL data analysis unit 1603 stores intermediate data as an analysis result in the intermediate buffer to facilitate management of each page.

Upon detecting data storage in the intermediate buffer, a rendering processing unit 1604 starts rendering. More specifically, the rendering processing unit 1604 reads out the data of each page from the intermediate buffer, and in normal printing (when neither box storage nor hold storage is designated), generates print image data of one page and stores it in an image buffer.

Upon detecting that the image data of one pate is stored in the image buffer, an output controller 1605 reads out the image data and outputs it to the printer unit.

If a job of interest is designated for job hold storage, the rendering processing unit 1604 sequentially stores the rendered image data of the respective pages in a hold queue. In this case, the output controller 1605 is not activated immediately, and instead, prints the job in accordance with a hold cancel (print) instruction from a UI controller 1606.

The holding function is a function of temporarily storing a job in one of boxes allocated in a storage means such as an HDD and starting printing only when receiving a user instruction from the operation unit 1008. This function is used to perform test print first and, if the print result has no problem, execute final printing (of a plurality of copies). It is therefore unnecessary to retransmit the job data from the host computer again for final printing.

For a box-storage-designated job, the rendering processing unit 1604 stores the rendered image data of each page in a box. The "box" here is equivalent to a folder (directory). Even if the image data are stored in the box, the output controller 1605 is not immediately activated. The output controller 1605 is activated when a job print instruction is received from the UI controller 1606. The boxes are named, for example, "01" to "99", though it changes depending on the capacity of the HDD 1500. This allows the user to selectively use the boxes in accordance with the user or application purpose. It is also possible to set a password for each box.

The UI controller 1606 controls the UI (User Interface). The UI controller 1606 transfers display data to the operation unit 1008 and notifies the MFP controller 1000 of input from the operation unit 1008. In this embodiment, a display unit provided on the operation unit 1008 is a liquid crystal display. The operation unit 1008 has several keys. A touch panel is provided on the front surface of the liquid crystal display. The UI controller 1606 controls to, for example, display a character string corresponding to a user operation, switch the window, and transmit a set value to another module.

The job controller 1600 manages jobs in the device and controls job generation and deletion, job states, and job process order.

Particularly, the job controller 1600 incorporates a print execution queue to determine the storage source of image data to be output to the output controller 1605, a box, image buffer, or hold queue (the print execution queue is a RAM because the information amount is small, though it may be the HDD). For a normal print job, information (job ID to be described later) to specify the job is automatically set in the print execution queue. The job ID of a job in a box or hold queue is registered in the print execution queue only when the user starts printing. Hence, the job controller 1600 determines the storage source of the image data, a box, image buffer, or hold queue based on the job ID registered in the print execution queue. When the storage source is determined, the job controller 1600 controls to output the image data of each page of the job to the output controller 1605.

Figure 19:
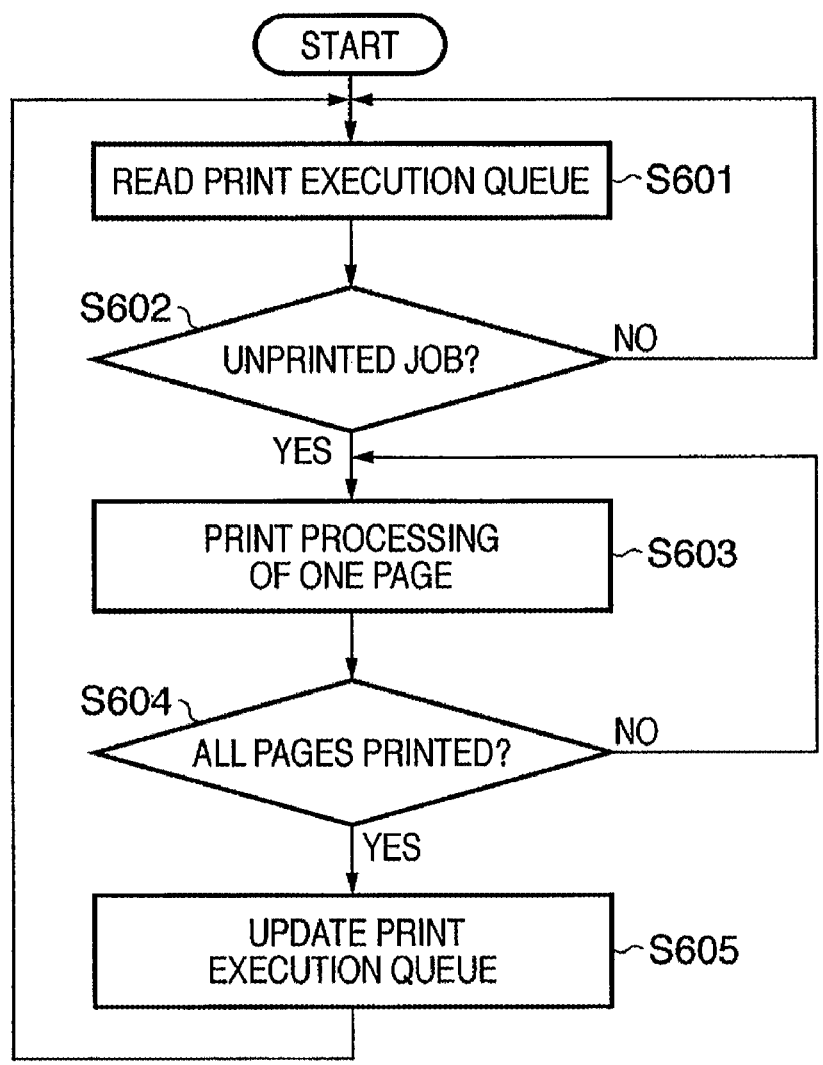
FIG. 19 is a flowchart illustrating a print process procedure with registration in the print execution queue according to the embodiment.

The process of the job controller 1600 as one of the process programs of the MFP controller 1000 will be described with reference to the flowchart in FIG. 19.

In step S601, the MFP controller 1000 reads the print execution queue. In step S602, the MFP controller 1000 determines whether an unprinted job exists. If NO in step S602, the process returns to step S601.

If the MFP controller 1000 determines that an unprinted job exists in the print execution queue, the process advances to step S603. In step S603, the MFP controller 1000 determines, on the basis of the job ID (to be described later) of the unprinted job, the location of corresponding image data, a box, image buffer, or hold queue, reads out the image data of one page, and executes the print processing. This process is repeated until the MFP controller 1000 determines in step S604 that all pages are printed.

If the MFP controller 1000 determines that all pages are printed, the process advances to step S605 to delete the print job ID and print job data of interest from the print execution queue. As will be described later, in test print, the MFP controller 1000 deletes the job ID from the print execution queue but not the print job data entity (and job management table).

On the other hand, various kinds of applications and a printer driver to use the MFP 100 of this embodiment are installed in the client PC 200 (FIG. 1).

Figure 5:
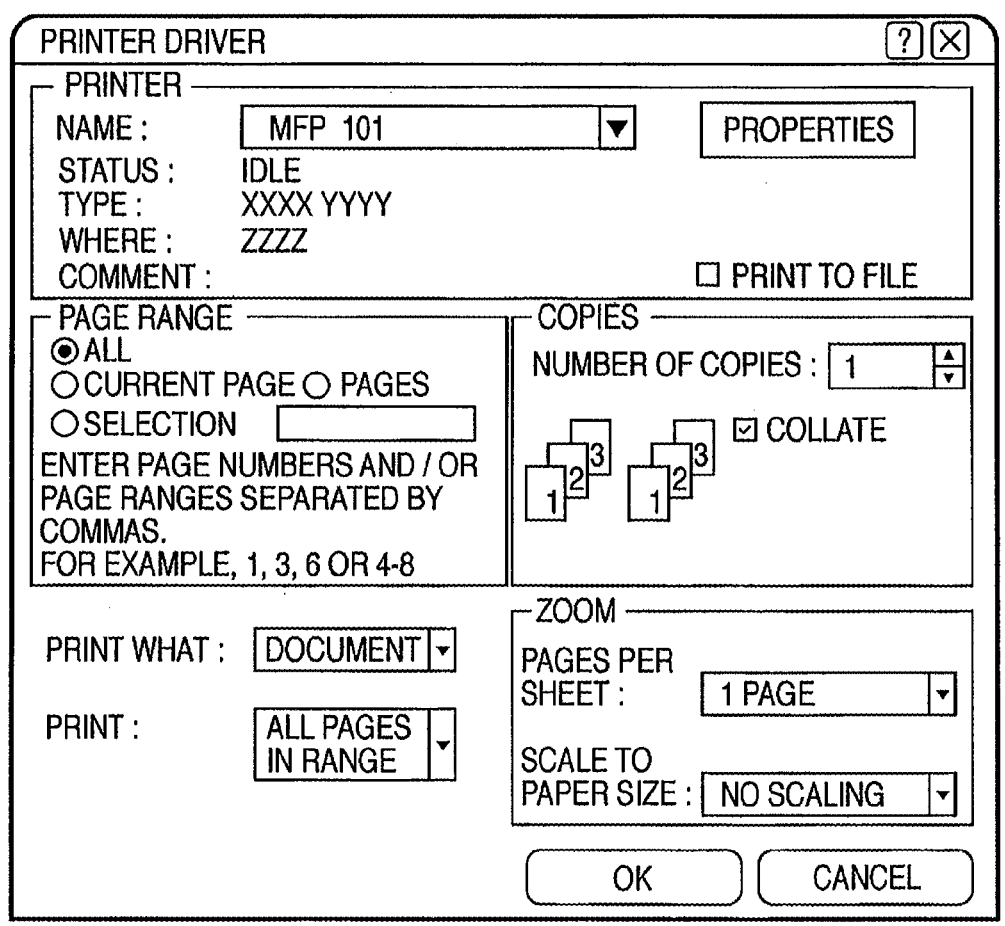
FIG. 5 is a view showing an example of the setup window of a printer driver executed by a host computer.

FIG. 5 shows an example of the print setup window of the printer driver of the client PC 200. When the user selects the print menu of a running application, the printer driver displays this window.

"Printer name" in the setup window has a pull-down list box. When the user selects a printer to be used by using a pointing device, "status" below displays the status of the print device, "type" displays the type of the printer driver, "where" displays installation location information of the print device, and "comment" displays comment information from a print device administrator. These pieces of information are obtained by issuing an information transfer request message to the corresponding printer when the print setup window is displayed, or the printer to be used is selected.

To output print data to a file without transmitting it to a print device, the user selects a "print to file" check box. Consequently, print data generated by the printer driver can be stored in a storage device of the client PC as a file.

"Page range" has radio buttons "all", "current page", "selection", and "pages" as items to select pages to be printed. The user selects one of the radio buttons (the default is "all"). When the user selects "pages", the edit box shifts to an input enable state. The user inputs the numbers of pages to be printed by using the keyboard.

The user can also select the attribute of the print target document by using a "print what" pull-down list box. The user can designate, in a "print" pull-down list box, whether to print all pages or only odd- or even-numbered pages.

In "copies", the user can set the number of copies to be printed. The user inputs the number of copies to be printed in the "number of copies" spin box. To print a plurality of copies not page by page but copy by copy, the user selects a "collate" check box.

In "zoom", the user can designate N-up printing (printing of laying out N pages on one print surface) from a "pages per sheet" pull-down list box. The user selects a paper size to the document size from a "scale to paper size" pull-down list box.

The user presses a "properties" button to set more detailed print attributes.

At the end of setting in the printer driver setup window, the user presses an "OK" button to cause a print device such as an MFP to print the print data or output it to a file. To stop printing or file output, the user presses a "cancel" button.

Figure 6:
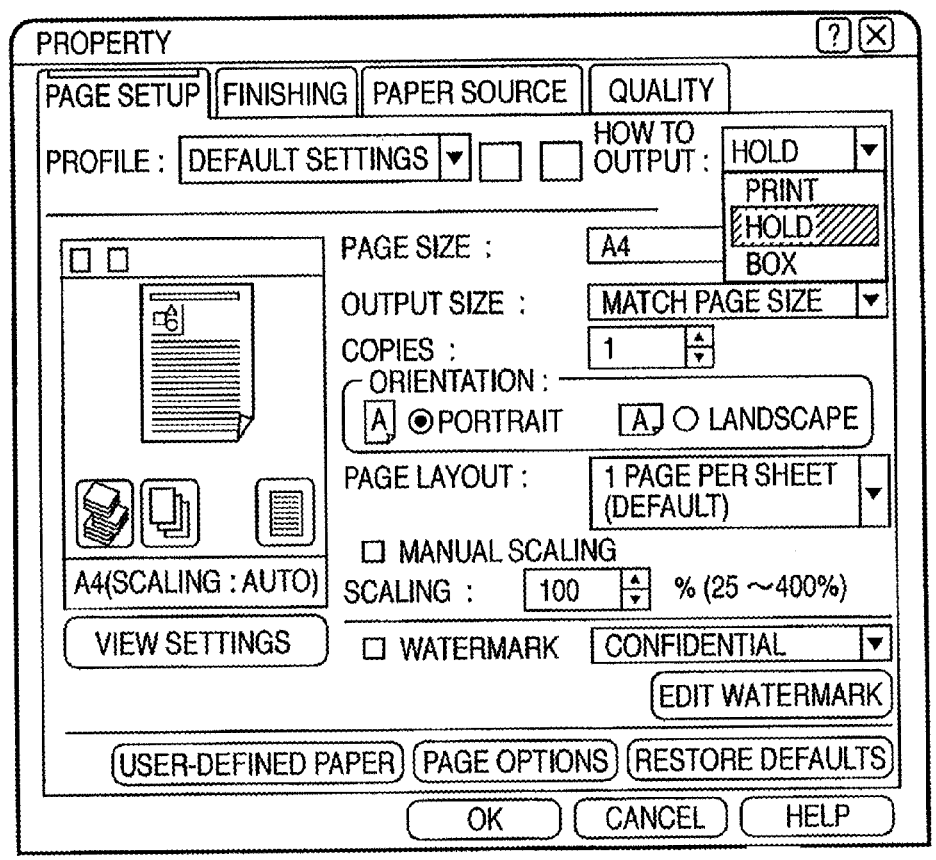
FIG. 6 is a view showing an example of the property setup window of the printer driver executed by the host computer.

FIG. 6 shows an example of a setup window which is displayed when the user indicates the "properties" button on the window in FIG. 5 by using a pointing device. The setup window has a plurality of tabs. In the initial state, the "page setup" tab is selected.

In a "profile" pull-down list box, the user selects optimal page settings from predetermined page setting modes. The user can add or edit a profile option with two buttons located on the left.

When the CPU of the client PC detects that a "view settings" button is pressed, the print image of the first page is displayed in the page image area displayed above the "view settings" button in accordance with the contents set in the property set up window.

In a "how to output" pull-down list box, the user selects an output method by determining whether to cause a print device such as an MFP to execute normal printing, save print data in the hold queue (hard disk) of the print device, or save print data in a box (hard disk) (a box is equivalent to a folder).

When the user designates "hold queue", the printer driver generates print data with a job ticket representing the hold queue and outputs the data. Upon receiving this print data, the MFP controller 1000 generates a print image and stores each page in the hold queue. That is, the MFP 100 does not execute the print processing at this point of time. The print processing starts when the MFP controller 1000 determines that a print instruction is received from the operation unit 1008.

When the user designates "box", the printer driver displays a selection menu to cause the user to select a box. Since the box names are managed as number sequences, a text area to input a number sequence may be displayed. The printer driver generates a job ticket containing information representing that the box function is used and information that specifies the box, generates print data containing the job ticket, and outputs it. Upon receiving the print data, the MFP controller 1000 generates a print image and stores each page in the designated box. That is, the MFP 100 does not execute the print processing at this point of time. The print processing starts when the MFP controller 1000 determines that a print instruction is received from the operation unit 1008.

The user selects a print target page size and an output paper size of the print device in a "page size" pull-down list box and "output size" pull-down list box.

The user inputs the number of copies to be printed to a "copies" spin box and selects the direction of output sheets of the print device from "portrait" and "landscape" of an "orientation" radio button.

The user designates N-up printing (printing of laying out a plurality of pages on one print surface) from a "page layout" pull-down list box. When selecting a "manual scaling" check box, the user can input the scaling ratio in units of % into a "scaling" spin box.

When selecting a "watermark" check box, the user can select a predetermined watermark type from a pull-down list box. By pressing an "edit watermark" button, the user can add or edit a watermark type.

The user can define paper by pressing a "user-defined paper" button. The user can set detailed page options by pressing a "page options" button. The user can return the various setting contents to defaults by pressing a "restore defaults" button.

At the end of setting in the printer driver property setup window, the user presses an "OK" button. Upon detecting that the "OK" button was pressed, the printer driver reflects these print attributes on actual printing. To stop settings in the property setup window, the user presses a "cancel" button. A "help" button displays a help window for the property setup window.

Upon detecting that the user has pressed the "OK" button in FIG. 5, the CPU of the client PC receives data transferred by an application and generates print data containing a job ticket and PDL data. Then, the OS (Operating System) of the client PC transfers the print data to the MFP 100 of the embodiment as a print job.

Figure 7:
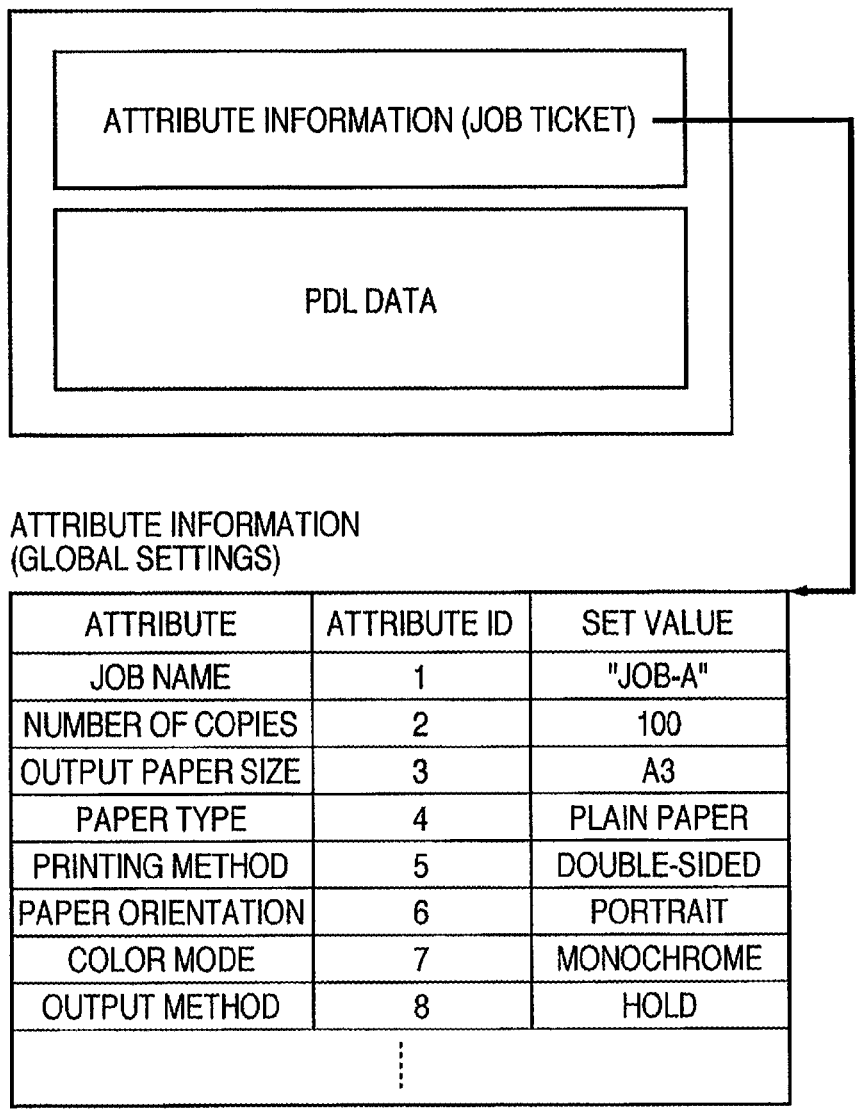
FIG. 7 is a view showing the structure of job data generated by the printer driver.

FIG. 7 shows the data structure of a print job transferred to the MFP 100. The print job data contains attribute information (job ticket) and PDL data.

The attribute information (global settings) stores the attribute IDs and set values of attributes such as "job name", "number of copies", "output size", "paper type", "printing method", "paper orientation", and "color mode". The attribute information is described in a format such as XML.

In the example shown in FIG. 7, attribute information (exceptional settings) stores "start page" and "end page" information as "application range", and the attribute IDs and set values of attributes such as "job name", "number of copies", "output size", "paper type", "printing method", "paper orientation", "color mode" and "output method". A set value according to the settings in the driver setup window or property setup window is set for each attribute. The output method indicates "hold".

Figure 8A:
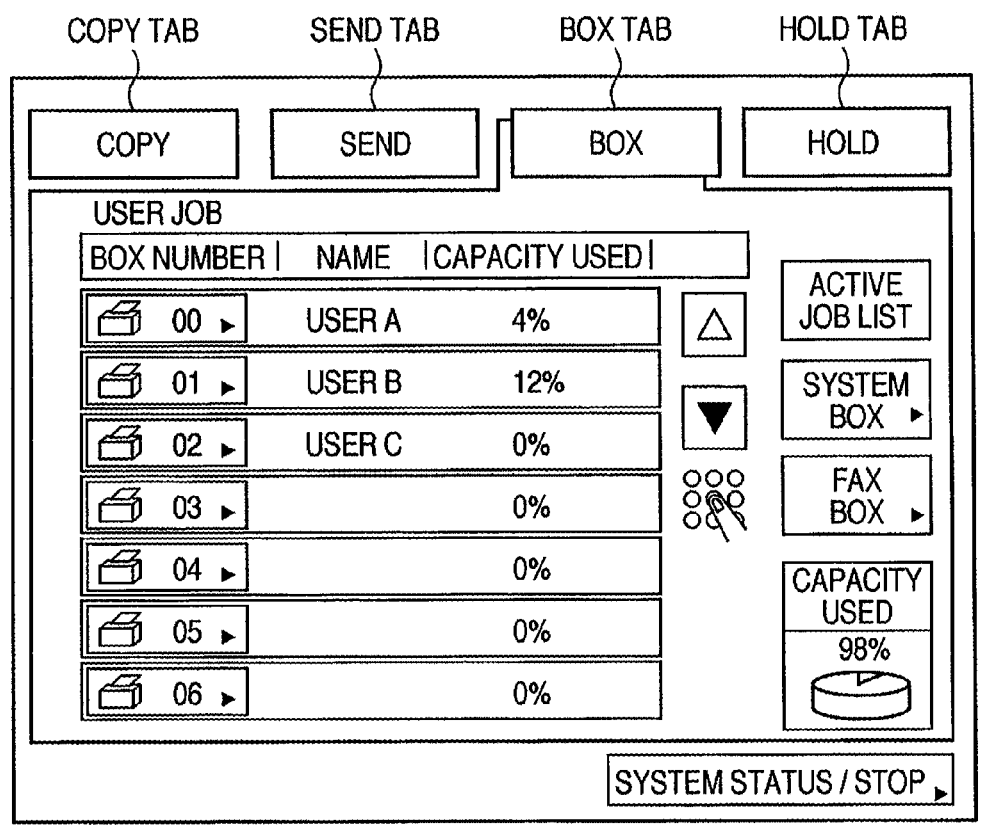
FIGS. 8A and 8B are views showing a box tab display example of an MFP touch panel unit according to the embodiment.

The operation unit 1008 of the MFP 100 according to the embodiment will be described next. FIG. 8A shows an example of a window displayed on the display unit of the operation unit 1008 of the MFP 100.

The operation unit 1008 according to the embodiment uses a touch panel. The window shown in FIG. 8A has tabs corresponding to functions. In this embodiment, "copy", "send", "box", and "hold" tabs are present. FIG. 8A shows a state wherein the "box" tab is active. This display window is called a box tab main window.

The box tab main window displays a list of boxes allocated in the HDD 1500. This display process is performed by causing the MFP controller 1000 to refer to the HDD 1500 and outputting the result to the operation unit 1008. The information of each box contains a box number, name, and capacity used. Upon detecting the button of a box desired by the user was touched on the operation unit 1008, the MFP controller 1000 displays the job list window of the box.

Figure 8B:
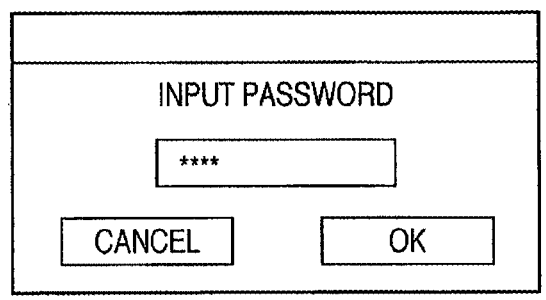

It is possible to set a password for each box. If a password is set, a password input window pops up, as shown in FIG. 8B. When the user inputs a correct password, the job list window is displayed. The password is input using number keys provided on the operation unit 1008. The password may be input using a touch keyboard displayed on the display screen.

Figure 9:
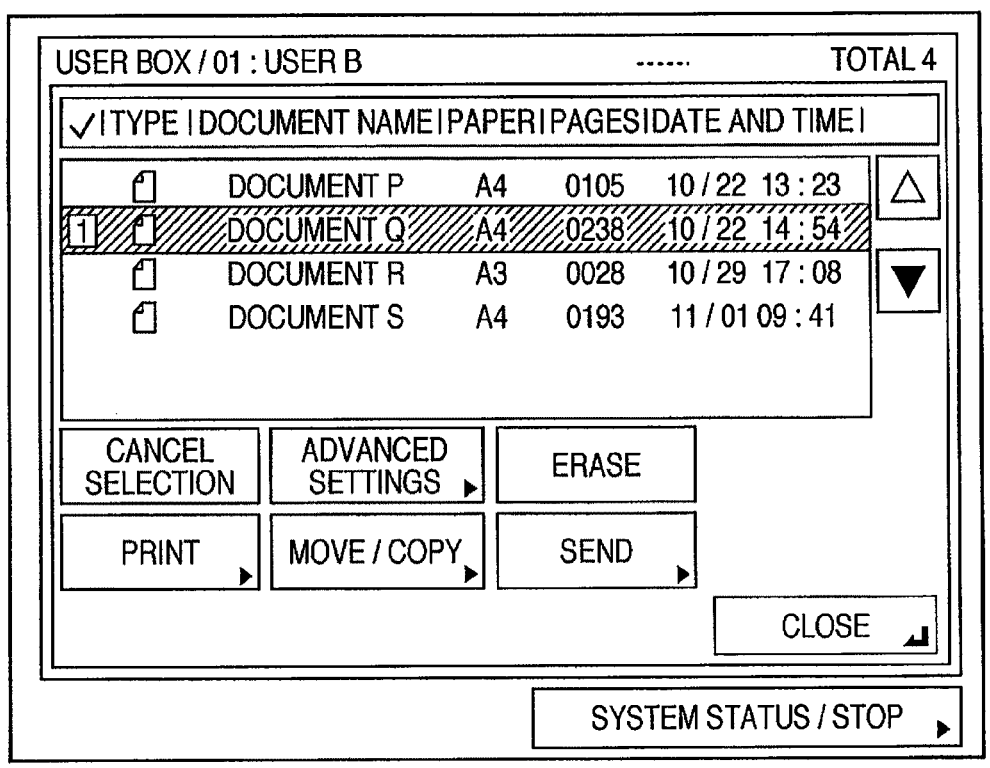
FIG. 9 is a view showing a display example of the list of jobs registered in a selected box.

FIG. 9 shows a job list display window that is displayed when the user touches box number 01 in the display window shown in FIG. 8A. "Type", "document name", "paper (size)", "page (total number of pages)", and "date and time (job storage date and time)" are displayed as the information of each job.

The user touches one of buttons provided on the low side of the window in correspondence with a displayed desired job, thereby requesting the MFP 100 to execute a corresponding process.

The user can select a job by touching the line where the job is displayed. The user can select a plurality of jobs. If a plurality of jobs are selected, the selection order can be recognized by numbers on the left side of the jobs. To select a plurality of jobs and input a print instruction, the user selects jobs to be printed and touches a "print" button. As a result, the print processing starts in accordance with the selection order. Job operation buttons include "advanced settings", "erase", "print", "move/copy", and "send". When the user presses the "advanced settings" button, the detailed information of a corresponding job is displayed. The print settings are displayed in the job list. When the user presses the "erase" button, the corresponding job is erased. When the user presses the "print" button, printing of the corresponding job starts. When the user presses the "send" button, a window to sent the corresponding job by e-mail is displayed. The user presses a "cancel selection" button to cancel selection.

FIGS. 10A to 10D are views showing changes in the box tab window. When it is detected that the user selects one box in the main window (box list display) shown in FIG. 10A, and a password is set for the box, the MFP controller 1000 displays the password input window in FIG. 10B (FIG. 8B) and waits for password input by the user. If the input password is correct, or no password is set for the selected box, the MFP controller 1000 displays the box job list window in FIG. 10C (described above in detail with reference to FIG. 9). When the user selects a job, and touch on the "print" button is detected, the MFP controller 1000 displays a print window in FIG. 10D. Upon detecting touch on a "print" button in the print window in FIG. 10D, the MFP controller 1000 starts printing the corresponding job and returns the display window to FIG. 10A. That is, when the user touches the "print" button in FIG. 10D, the display state is not maintained. This is because an individual sometimes stores a confidential document by setting a password. With the above process, the user who has input a print start instruction can leave the MFP 100 without any problem because the MFP 100 never displays the window in FIG. 10C unless an authentic password is input.

Figure 11:
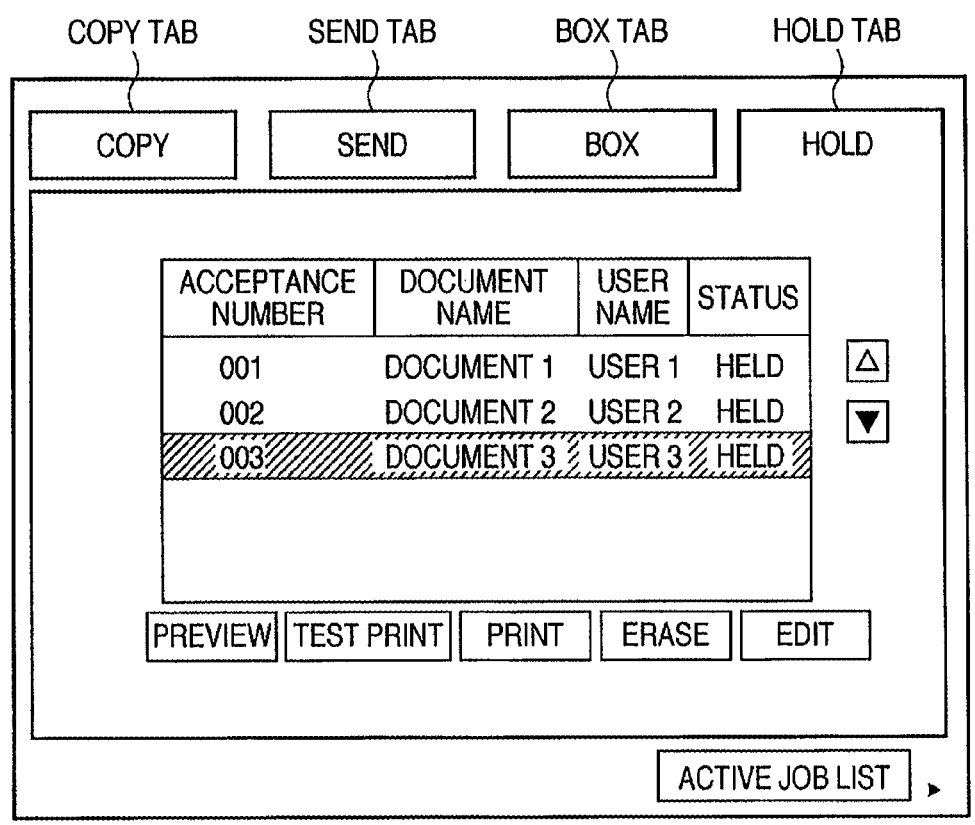
FIG. 11 is a view showing a hold tab display example of the MFP touch panel unit according to the embodiment.

FIG. 11 shows a display window (hold tab main window) that is displayed when the user touches the "hold" tab in FIG. 8A. In other words, when the user touches the "hold" tab, the MFP controller 1000 controls the operation unit 1008 so as to display the main window. At this time, the MFP controller 1000 reads out job information from a folder dedicated to a hold queue preset in the HDD 1500 and displays a list, as shown in FIG. 11.

Only one hold queue exists in the HDD 1500 without password setting, unlike the boxes, and is used to temporarily store jobs. The window displays "acceptance number", "document name", "user name", and "status" as the information of each job stored in the hold queue. "Status" indicates the process status of a job. In the hold queue, the statuses include "held" indicating a held state and "stored" indicating that data is stored.

The user can select one or a plurality of jobs. After selecting a job, the user touches a button on the lower side of the window to execute a corresponding job operation. Operation types are "preview", "test print", "print", "erase", and "edit". "Preview" displays a preview of the corresponding job. "Test print" prints only one copy of the corresponding job. "Print" prints the corresponding job. "Erase" erases the corresponding job. "Edit" changes the settings of the corresponding job.

FIG. 12A shows a hold job list window (main window) that is displayed when the user touches the hold tab. When the user selects a target job in this window, and it is then detected that the user touches the "print" or "test print" button, the MFP controller 1000 starts the print processing (more exactly, registers the job in the print execution queue) and displays a window (active job list window) shown in FIG. 12B. FIG. 12B shows the print execution queue.

In the example shown in FIG. 12A, the user instructs to print the job with acceptance number "003". Hence, FIG. 12B shows that the job is registered at the end of the print execution queue.

Figure 4:
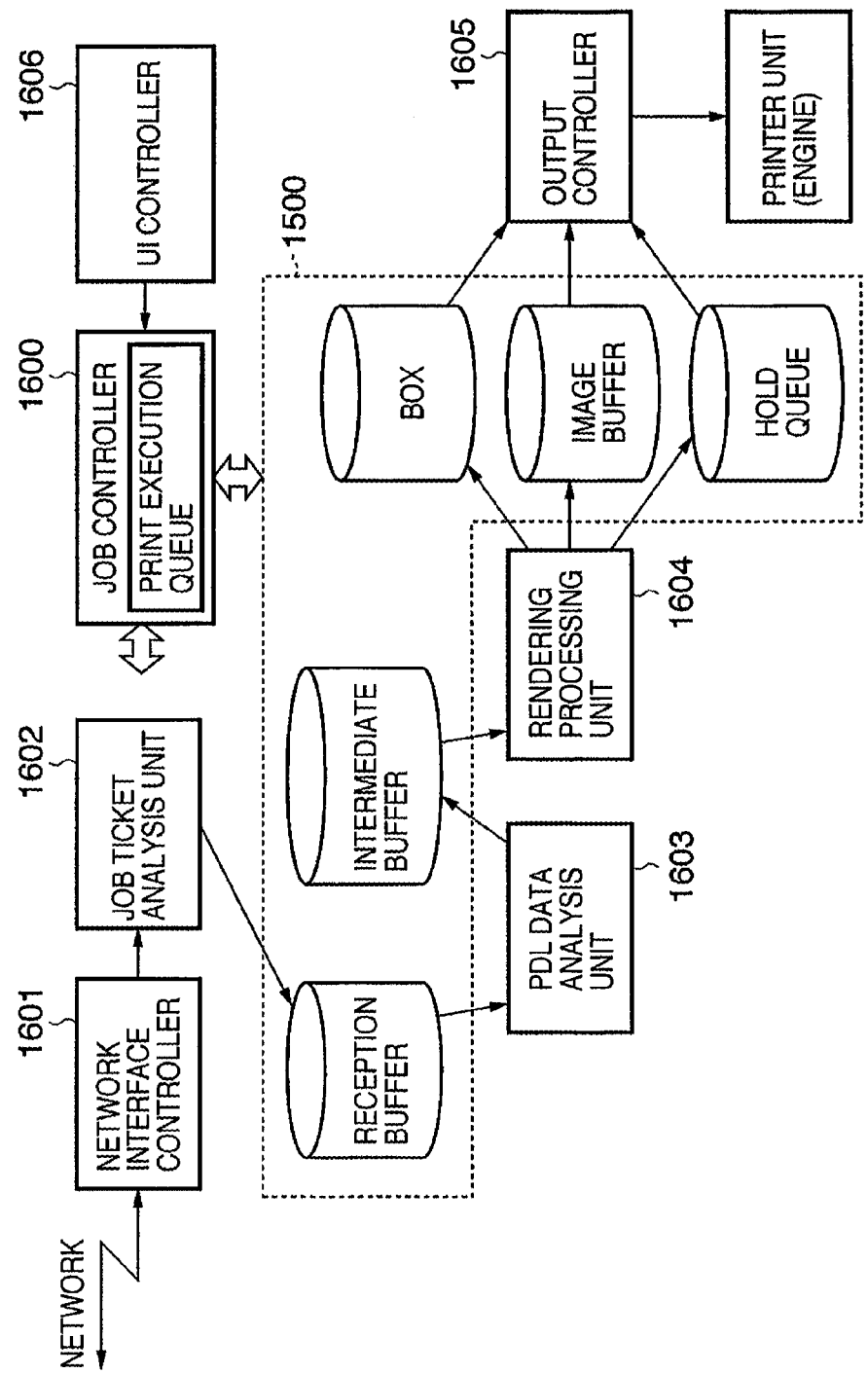
FIG. 4 is a block diagram showing the arrangement of firmware which implements the process of an MFP controller according to the embodiment.

The job list displayed in the job list window in FIG. 12B includes jobs print-instructed from the boxes in FIG. 4, jobs print-instructed from the image buffer, and jobs print-instructed from the hold queue, as described above. That is, all jobs the MFP 100 is instructed to print are displayed.

"Acceptance number", "document name", "user name", "status", and "predicted time" are displayed as the information of each job. "Status" indicates the process status of a job. The statuses include "print" indicating that the print processing on paper is progressing and "standby" indicating that a job is in the queue and waits for the print processing. "Predicted time" indicates the time predicted until the completion of printing of a job and is calculated based on information such as the number of pages. In this embodiment, each page of a print-instructed job is already converted into image data, as is apparent from FIG. 4. For this reason, the predicted waiting time for printing can be calculated based on the processing capability (printer engine) of the printer unit (the number of pages printed per unit time) and the number of pages of each job.

The window shown in FIG. 12B has "priority print", "erase", "advanced settings", and "pause" buttons. When the user touches the "priority print" button, an instruction to move up the selected job in order as much as possible is input. If the job on the uppermost line is being printed now, the selected job moves up to the next (second) position.

When the user touches the "erase" button, the print processing of the job is canceled, and the job is erased from the list. In other words, upon detecting that the "erase" button was touched, the MFP controller 1000 deletes the job and reflects the result on the display window of the operation unit 1008.

When the user touches the "advanced settings" button, the settings of the job are displayed. When the user touches the "pause" button, the process of the job is paused. The "pause" button is a toggle and switches between the paused state and the standby state every time the user touches it. When the user touches a "hold job list" button, the display returns to the window in FIG. 12A.

The hold queue temporarily stores jobs. Without password setting, the hold queue is handled like a shared folder. Hence, anyone can store jobs in the hold queue. In some cases (depending on a workflow in a workplace), a job is always stored in the hold queue, and after confirming the state of, for example, paper sheets set in the device, printing is started. In this case, the user may want to confirm both each job status in the hold queue and the status of a job that is being printed. Actually in the commercial printing industry, some printer controllers with a large display screen display both statuses simultaneously. However, most image forming apparatuses cannot display both windows simultaneously because of a small display size, or can display only several lines at once and have poor visibility.

In this embodiment, when the print operation is executed in the window shown in FIG. 12A (when the "test print" button or "print" button was touched), the list of jobs currently under the print processing in FIG. 12B is displayed automatically.

The window in FIG. 12B automatically selects and displays a job for which printing is executed. The user can immediately execute a job operation (e.g., "priority print" or "pause") for the job.

If a job is selected in the window in FIG. 12A, and the window in FIG. 12B is kept displayed, the user cannot know the process status of the job after printing. If a dedicated button to display the window in FIG. 12B is prepared, the number of times of operations increases, resulting in cumbersomeness. In this embodiment, however, the window in FIG. 12B can automatically be displayed only by selecting a job and inputting a print instruction. Hence, the user can grasp the turn of the selected job. In this state, the user can also grasp an approximate time necessary for completing printing.

When a job is selected in the window in FIG. 12A, and print instruction input is detected, the MFP 100 executes the following process.

Each job registered in the active job list is expressed by a variable i (i=1, 2, 3, . . . ) The number of unprinted pages of each job is expressed by P(i). P(i) indicates the total number of unprinted pages of a job i. More specifically, total number of unprinted pages=number of unprinted pages of document× number of copies to be printed. The print capability of the printer unit, that is, the number of pages printed per unit time (1 min in this embodiment) is expressed by V.

In this case, a waiting time T(k) for completion of printing of the kth job is given by $$T(k)=\Sigma P(i)/V$$

where $\Sigma$ is the sum function of variables i=1, 2, 3, . . . , k.

The MFP controller 1000 calculates the predicted waiting time for completion of printing of each job by executing the above calculation for each job registered in the active job list and displays the result.

Even when the window in FIG. 12B is being displayed, the MFP controller 1000 executes the above process at an appropriate time interval. In this embodiment, the time interval is 1 min. In the above example, a relative time from the current time is displayed. However, a print completion time may be displayed by adding the time to the current time.

Figure 13:
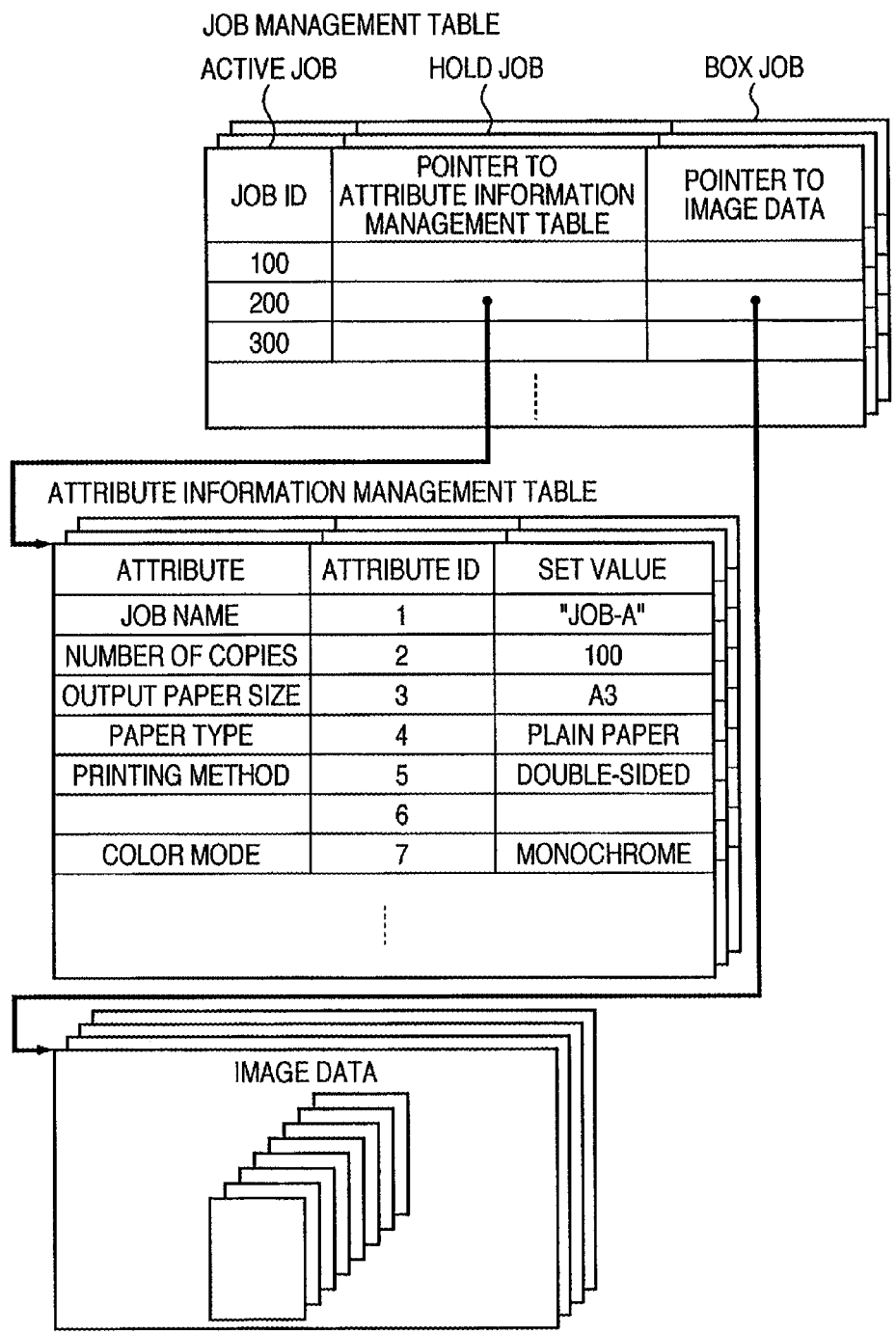
FIG. 13 is a view showing a job management table managed by the MFP controller according to the embodiment.

FIG. 13 shows a table to manage jobs in image forming apparatus. This table is held in the HDD 1500.

The job management table includes job IDs, pointers to an attribute information management table, and pointers to image data. A job ID is issued by the MFP controller 1000 to manage a job.

The job management table includes a table for active jobs, a table for hold jobs, and a table for box jobs.

The attribute information management table stores the attribute of each job and includes the attribute ID and set value of each job. Image data is managed for each job and for each page.

The process procedure of the MFP controller 1000 according to the embodiment will be described next with reference to the flowcharts in FIGS. 14 to 18.

Figure 14:
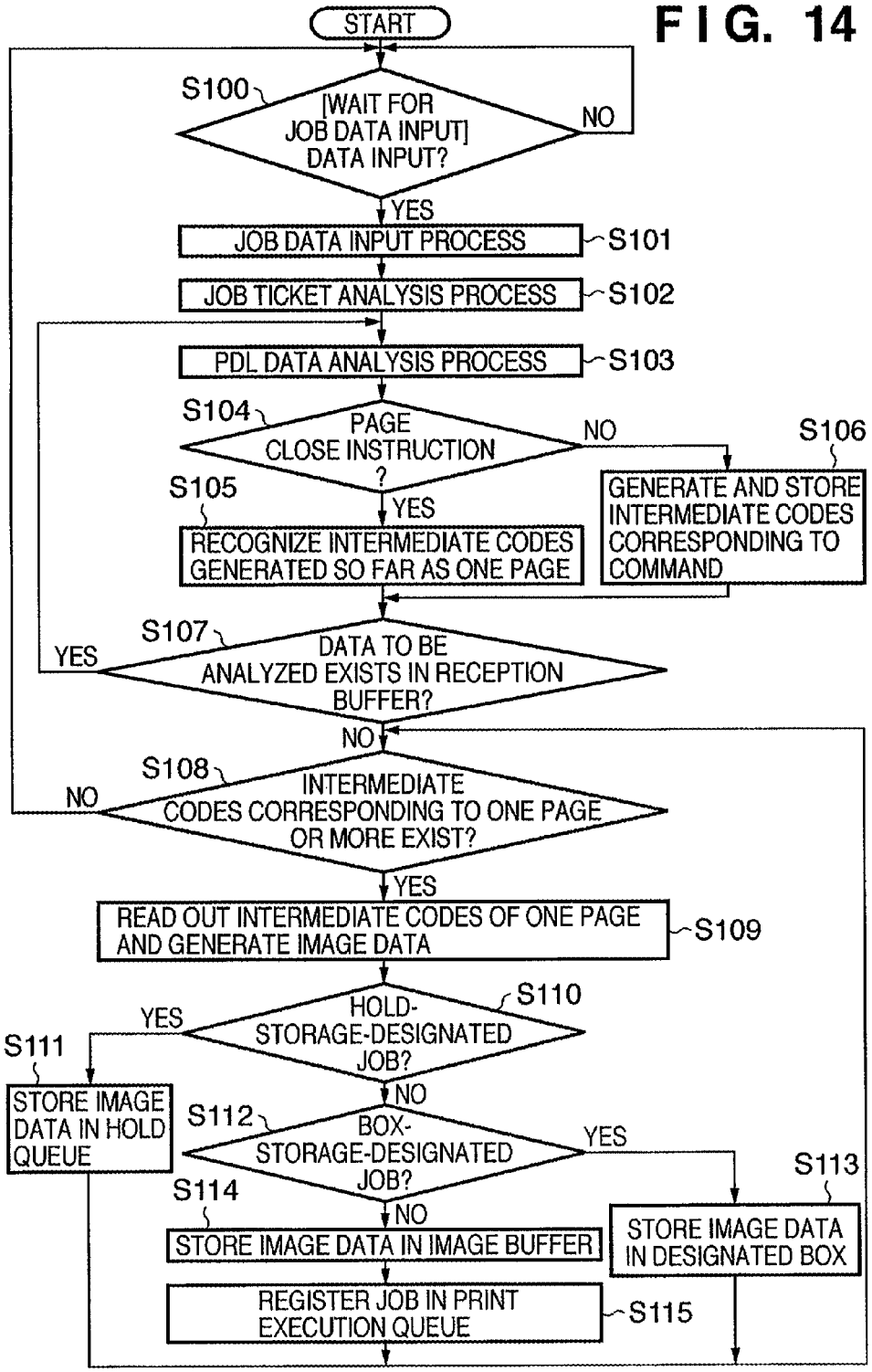
FIG. 14 is a flowchart illustrating the main process of the MFP controller according to the embodiment.

FIG. 14 illustrates the main process of the MFP controller 1000 according to the embodiment.

When the apparatus is powered on, the MFP controller 1000 waits for reception of print job data in step S100. When the MFP controller 1000 detects reception of print job data, the process advances to step S101 to input the print job data. The process in steps S100 and S101 is also the process of the network interface controller 1601 executed by the MFP controller 1000.

The MFP controller 1000 advances the process to step S102 and executes the process of the job ticket analysis unit 1602 to analyze the received print job data. After the analysis, the MFP controller 1000 stores the print data (PDL data) in the reception buffer of the HDD 1500. The MFP controller 1000 also analyzes the job ticket and determines which process should be executed for the job: hold, box, or normal printing. For hold, the MFP controller 1000 registers the job in the job management table for hold. For box, the MFP controller 1000 registers the job in the job management table for a box with a designated box number. For normal printing, the job will directly be registered in the print queue. Hence, the MFP controller 1000 registers the job in the active job management table.

The MFP controller 1000 advances the process to step S103 and analyzes the PDL data stored in the reception buffer (the PDL data analysis process will be described later in detail). In step S104, the MFP controller 1000 determines whether the command is a page close command (also determines whether the command indicates an end of one page). If the command is a page close command, the MFP controller 1000 recognizes intermediate codes generated so far as the data of one page (step S105). The intermediate codes are managed for each page, as described above.

If the MFP controller 1000 determines in step S104 that the command is not a page close command, the process advances to step S106 to generate intermediate codes having a format suitable for an internal process in accordance with the command.

In step S107, the MFP controller 1000 checks whether data to be analyzed exists in the reception buffer. If the MFP controller 1000 determines that data to be analyzed exists, the process returns to step S103 to repeat the PDL data analysis process. If the MFP controller 1000 determines that no data to be analyzed exists in the reception buffer, the process advances to step S108.

In step S108, the MFP controller 1000 checks whether intermediate codes corresponding to one page or more exist. If the MFP controller 1000 determines that intermediate codes corresponding to one page or more exist, the process advances to step S109 to read out intermediate codes of one page from the intermediate buffer and generates image data (bitmap) from the intermediate codes.

In step S110, the MFP controller 1000 determines whether the job is hold-designated. If the job is hold-designated, the MFP controller 1000 advances the process to step S111 to store the generated image data in the hold queue allocated in the HDD.

If the MFP controller 1000 determines that the job of interest is not hold-designated, the process advances to step S112. In step S112, the MFP controller 1000 determines whether the job of interest is box-storage-designated. If the job of interest is box-storage-designated, the MFP controller 1000 advances the process to step S113 to store the image data in the box designated by the job ticket.

If the MFP controller 1000 determines that the job of interest is a job (normal print job) that is not box-storage-designated, the process advances to step S114 to store the image data of one page in the image buffer. If the page stored in the image buffer is the first page of the normal print job, the MFP controller 1000 registers the job ID in the print execution queue in step S115.

If any other job is not undergoing the print processing; that is, if the job is registered at the top of the print execution queue, a process of reading out the image data of one page from the image buffer, converting the image data into a video signal, and transferring the video signal to the printer unit (engine) starts. The printer unit will execute printing on actual paper on the basis of the video signal and discharge the printed paper sheet to the outside.

Transfer to the printer unit and the storage process in the image buffer do not synchronize. Normally, conversion to image data is executed quicker than printing by the printer unit. Hence, the amount of image data in the image buffer from unprinted pages gradually increases.

After the process in step S115, the MFP controller 1000 returns the process to step S108. If intermediate codes corresponding to one page are not generated yet, the process returns to step S101 to wait for subsequent input data.

Figure 15:
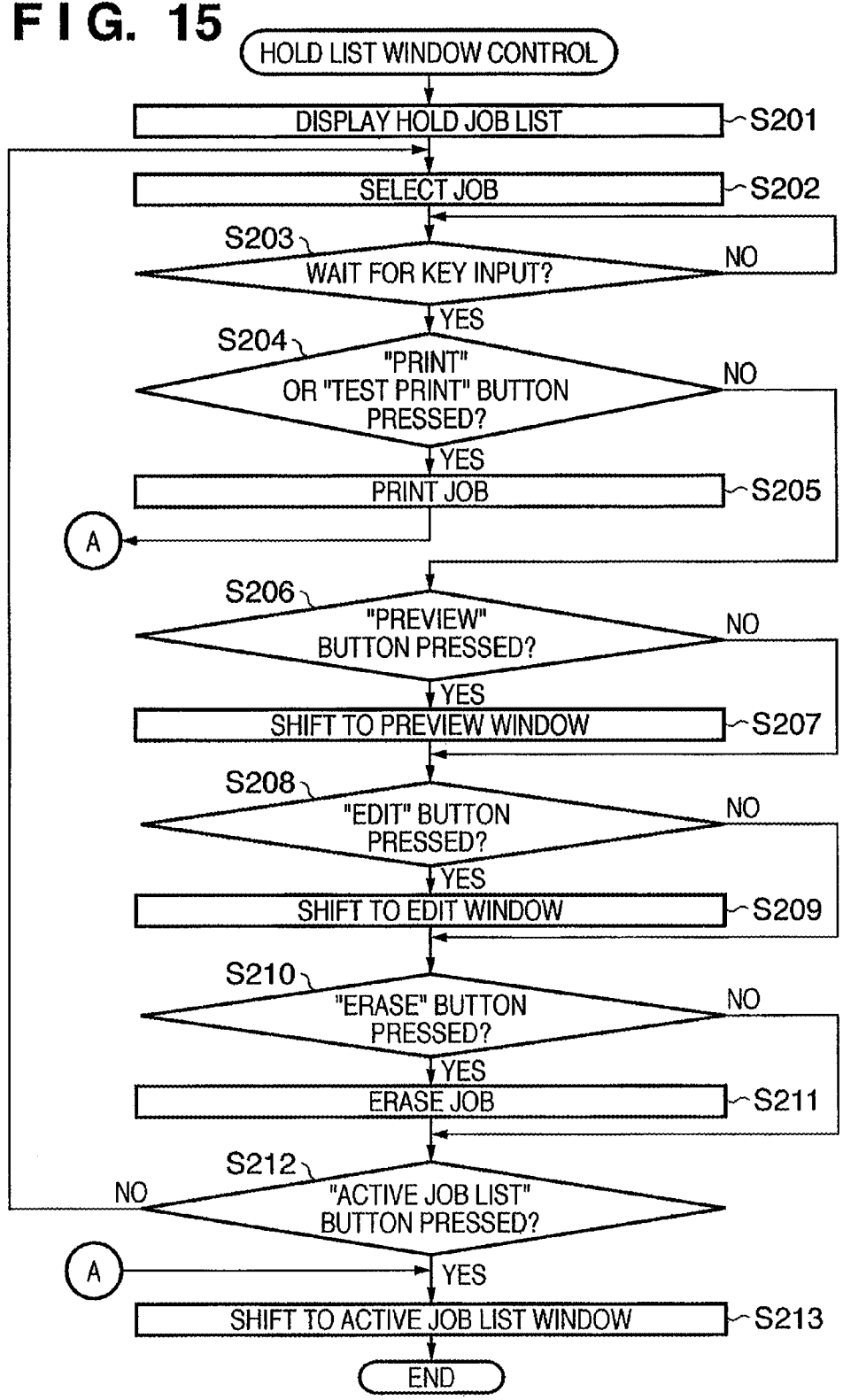
FIG. 15 is a flowchart illustrating a hold list display process executed by the MFP controller according to the embodiment.

FIG. 15 is a flowchart illustrating a hold list display process executed by the MFP controller and a process according to input to the touch panel by the user. The MFP controller 1000 executes the process shown in FIG. 15 as a task distinct from the main process in FIG. 14.

In step S201, the MFP controller 1000 displays the list of hold jobs stored in the hold queue in accordance with the information in the hold job management table.

In step S202, the MFP controller 1000 waits for job selection. As described above, the user can select one or a plurality of jobs from the displayed list. In the initial state, the job at the top of the list is highlighted.

The MFP controller 1000 advances the process to step S204 to wait for key input. When the MFP controller 1000 detects key input, the process advances to step S204.

In step S204, the MFP controller 1000 determines on the basis of user's touch position information from the operation unit 1008 whether the "print" button or "test print" button was touched (this will simply be expressed as "the MFP controller 1000 determines whether the "xxxx" button was touched" hereinafter).

Upon detecting touch of the "print" or "test print" buttons, the MFP controller 1000 advances the process to step S205 to start the print processing of the job. The MFP controller 1000 advances the process to step S213 to display the active job list window. In test print, the MFP controller 1000 executes the print processing of only one copy independently of the actual number of copies set for the job.

If the MFP controller 1000 determines in step S204 that neither the "print" button nor the "test print" button was touched, the process advances to step S206.

In step S206, the MFP controller 1000 determines whether the "preview" button was touched. If the MFP controller 1000 determines that the "preview" button was touched, the process advances to step S207 to display the preview window of the first page of the job.

In step S208, the MFP controller 1000 determines whether the "edit" button was touched. If the MFP controller 1000 determines that the "edit" button was touched, the process advances to step S209 to display a job ticket editing window. If the MFP controller 1000 determines that a button other than the "edit" button was touched, the process advances to step S210.

In step S210, the MFP controller 1000 determines whether the "erase" button was touched. If the MFP controller 1000 determines that the "erase" button was touched, the process advances to step S211 to delete the selected job. More specifically, the MFP controller 1000 deletes the corresponding data from the hold job management table and erases the image data in the hold queue.

In step S212, the MFP controller 1000 determines whether the "active job list" button was touched. If the MFP controller 1000 determines that the "active job list" button was touched, the process advances to step S213 to display the active job list window (the window shown in FIG. 12B).

Figure 16:
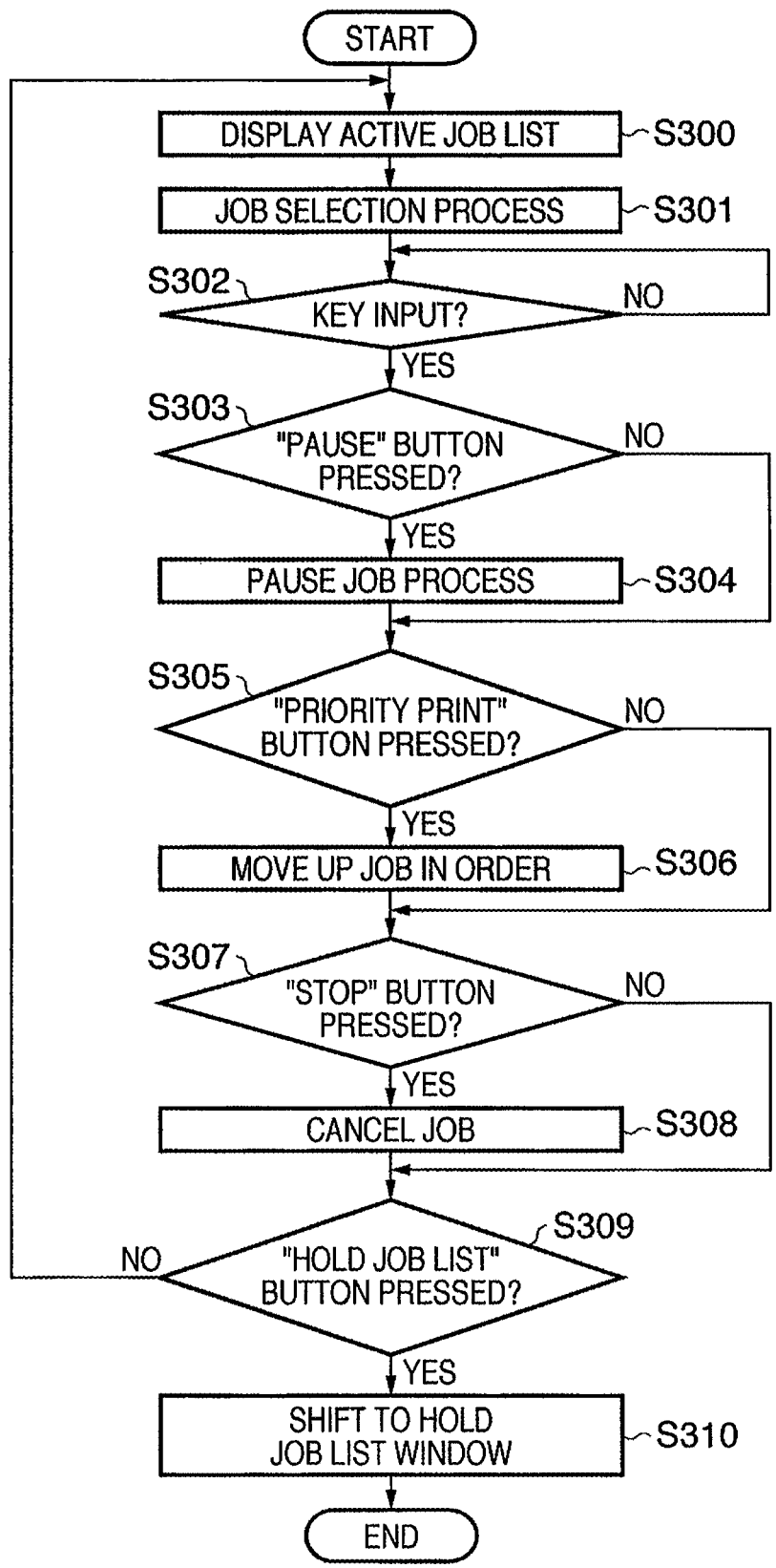
FIG. 16 is a flowchart illustrating an active job list display process executed by the MFP controller according to the embodiment.

FIG. 16 is a flowchart illustrating an active job list (FIG. 12B) display process and a process according to user input, which are executed by the MFP controller 1000.

In step S300, the MFP controller 1000 displays the active job list (FIG. 12B). At this time, the MFP controller 1000 refers to each job management table and calculates and displays the print completion time of each job in accordance with the number of unprinted pages and the number of copies of each of the active jobs registered in the print queue.

When the display process is ended, the MFP controller 1000 advances the process to step S301 to execute a process according to a user's job selection (e.g., by highlighting the selected job).

The MFP controller 1000 advances the process to step S302 to wait for touch (key input) of various displayed buttons. If the MFP controller 1000 determines that the operator has performed key input (in this embodiment, touch on the touch panel), the process advances to step S303.

In step S303, the MFP controller 1000 determines whether the "pause" button was touched. If the MFP controller 1000 determines that the "pause" button was touched, the process advances to step S304 to pause the print processing of the job. The job status indicates a pause state.

Note that if the selected job is already in the pause job state (displayed as "resume state"), and the MFP controller 1000 determines that the pause button was touched again, the pause state is canceled, and the process advances to step S305.

In step S305, the MFP controller 1000 determines whether the "priority print" button was touched. If the MFP controller 1000 detects touch of the "priority print" button, the process advances to step S306 to move up the selected job in order. Since it is impossible to pass the job that is currently being processed, the MFP controller 1000 moves the selected job to the top of the list of jobs which are awaiting printing on paper. After that, the MFP controller 1000 advances the process to step S307.

In step S307, the MFP controller 1000 checks whether the "stop" button was pressed. If the "stop" button was pressed, the process advances to step S308 to cancel the selected job.

In step S309, the MFP controller 1000 determines whether the "hold job list" button was touched. If the MFP controller 1000 detects touch on the "hold job list" button, the process advances to step S310 to display the hold job list window (the window shown in FIG. 11).

If it is determined in step S309 that a button other than the "hold job list" button was pressed, the MFP controller 1000 regards it as the end of key input, and the process returns to step S300. If the job print order is changed, the MFP controller 1000 executes step S300 again and updates the print completion time of each job.

Figure 17:
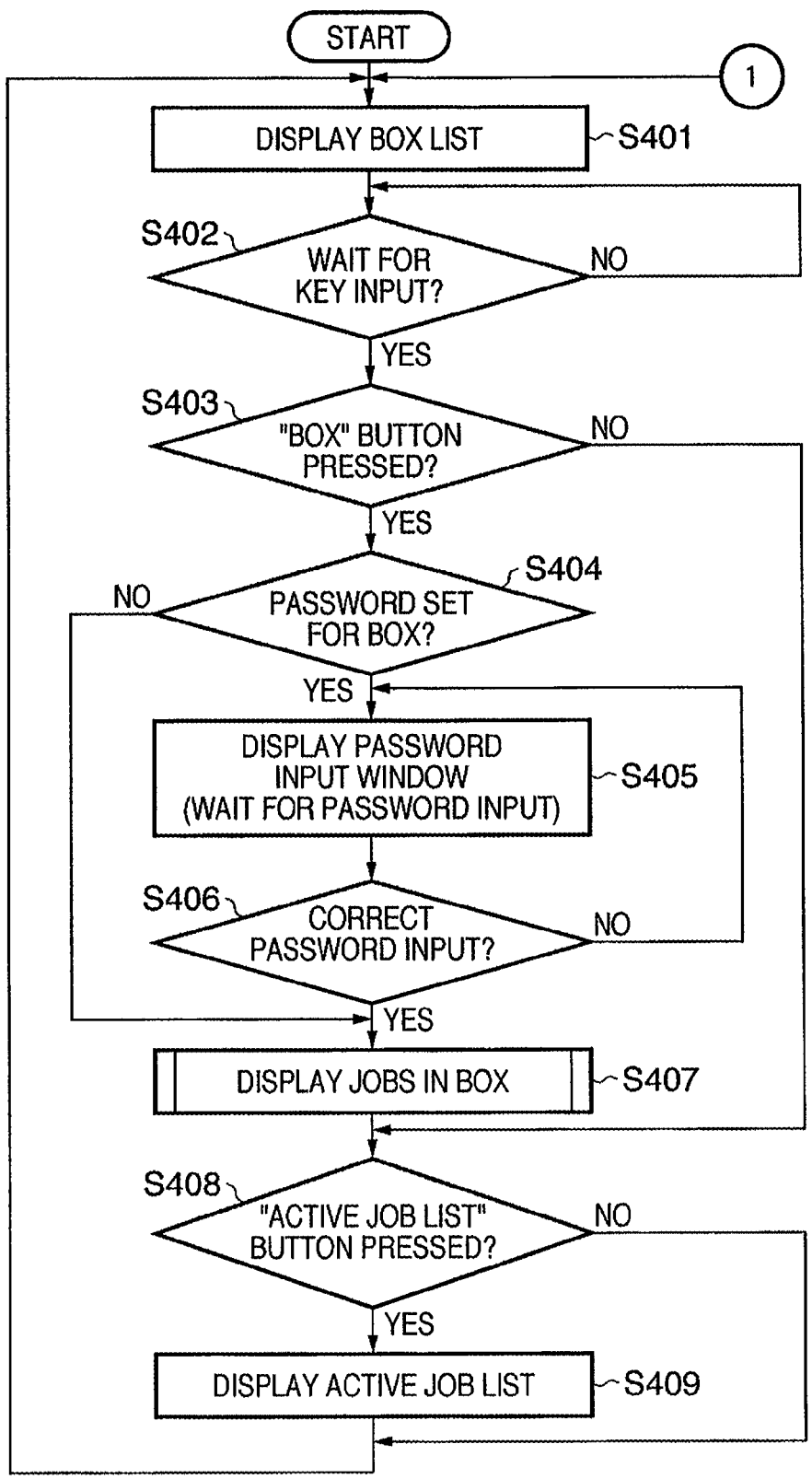
FIG. 17 is a flowchart illustrating a box list display process executed by the MFP controller according to the embodiment.
Figure 18:
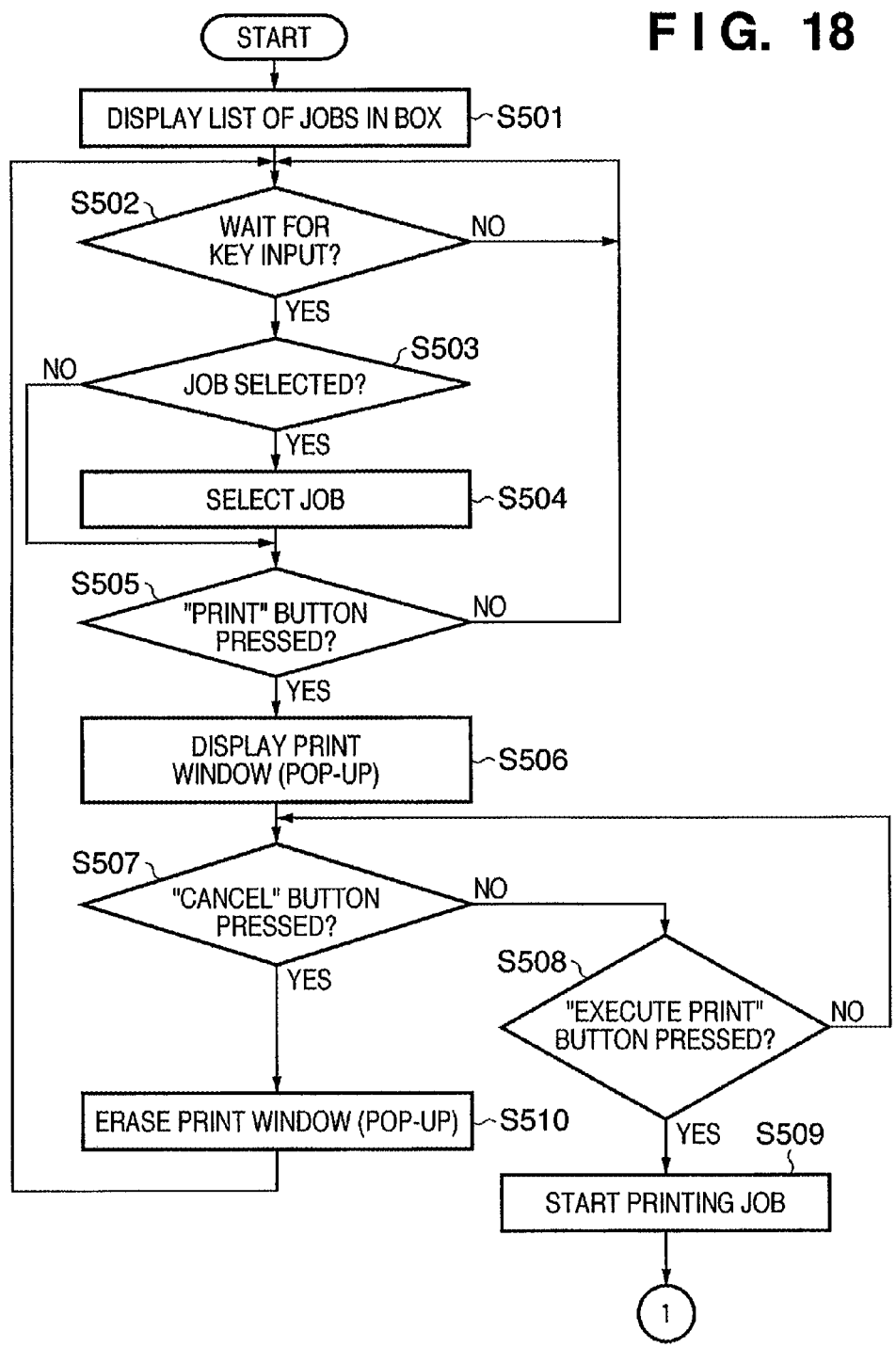
FIG. 18 is a flowchart illustrating a box job list display process executed by the MFP controller according to the embodiment.

FIGS. 17 and 18 are flowcharts illustrating a box list display process and a process according to user input. These flowcharts are related to control of the window shown in FIG. 8A.

In step S401, the MFP controller 1000 displays the box list. A box number, name, and capacity used are displayed as the information of each box. The name can be set by the user, and a detailed description thereof will be omitted herein.

The MFP controller 1000 advances the process to step S402 to wait for instruction input by the user.

In step S403, the MFP controller 1000 determines whether the user input indicates selection of a box button. In other words, the MFP controller 1000 determines which box is selected by the user.

If the MFP controller 1000 determines that a box button was touched, the process advances to S404 to determine whether a password is set for the selected box. If the MFP controller 1000 determines that no password is set for the box selected by the user, the process advances to step S407. If the MFP controller 1000 determines that a password is set for the selected box, the process advances to step S405 to display the password input window. In step S406, the MFP controller 1000 compares the password input by the user with the password set for the box and determines whether they match. Only upon determining that the passwords match does the process advances to step S407.

Note that a file representing the correspondence between a box and a password is saved in the HDD. The default of the password input area is null. When the password area is null, the MFP controller 1000 determines that no password is set for the box. If data other than null is stored, the MFP controller 1000 determines that a password is set.

In step S407, the MFP controller 1000 displays the list of jobs in the box (FIG. 9).

In step S408, the MFP controller 1000 determines whether the "active job list" button was touched. If the MFP controller 1000 detects touch of the "active job list" button, the process advances to step S409 to display the active job list (FIG. 12B).

If the MFP controller 1000 detects touch at a position other than the "active job list" button, the process returns to step S401.

FIG. 18 is a flowchart illustrating a box job list display process and a process according to user input, which are executed by the MFP controller 1000.

In step S501, the MFP controller 1000 displays the list of jobs in the box selected by the user (FIG. 9).

The MFP controller 1000 advances the process to step S502 to wait for user input.

When the MFP controller 1000 detects user input, the process advances to step S503 to determine whether the input indicates a job selection instruction. To select a desired job, the user touches the line of the job. If it is determined that the user input indicates job selection, the process advances to step S504 to execute the job selection process. Information (in this embodiment, a job ID) to specify the selected job is stored in the RAM (not shown) of the MFP controller 1000. Additionally, the corresponding line is highlighted to explicitly indicate the selected job. When at least one job is selected, the MFP controller 1000 enables and displays the "print" button to receive input of the "print" button.

If the MFP controller 1000 determines that the user input does not indicate job selection, the process advances to step S505 to determine whether the "print" button was touched. The presence/absence of touch on the "print" button is determined only when at least one job is selected, as described above.

If the MFP controller 1000 determines that a button other than the "print" button was touched or that none of jobs were selected, the process returns to step S502.

If the MFP controller 1000 determines that the "print" button was touched, the process advances to step S506 to display the print window (pop-up window).

In step S507, the MFP controller 1000 determines whether the "cancel" button was touched. If the MFP controller 1000 detects touch of the "cancel" button, the process advances to step S510 to erase the pop-up window, and the process returns to step S502.

If the MFP controller 1000 determines that the "cancel" button was not touched, the process advances to step S508 to determine whether the "execute printing" button was touched. If the MFP controller 1000 determines that a button other than the "execute printing" button was touched, the process returns to step S507.

If the MFP controller 1000 determines in step S508 that the "execute printing" button was touched, the process advances to step S509 to start the print processing of the selected job (register the job in the print queue), and the process returns to step S401 in FIG. 17.

The process procedure for a hold-designated job has been described above.

Figure 33:
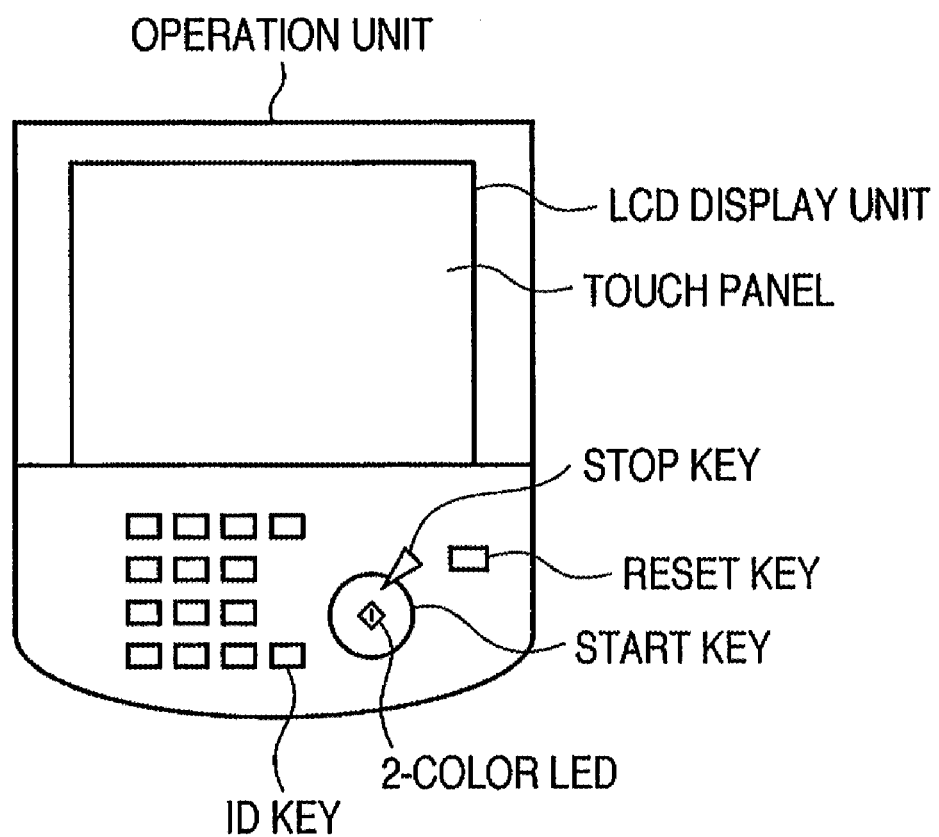
FIG. 33 is a schematic view of the operation unit according to the embodiment.

FIG. 33 is a view showing the outer appearance of the operation unit 1008 of the MFP 100 according to the embodiment. An LCD display unit has a touch panel sheet bonded to an LCD display screen and displays a system operation window and soft-keys. When the user presses a displayed key, its position information is sent to the MFP controller 1000. A start key is used to, for example, start a document image reading operation. A 2-color LED of green and red is provided at the center of the start key to indicate by the color whether the start key is usable. A stop key stops an operation that is being executed. The user uses an ID key to input his/her user ID. A reset key initializes settings from the operation unit.

Figure 20:
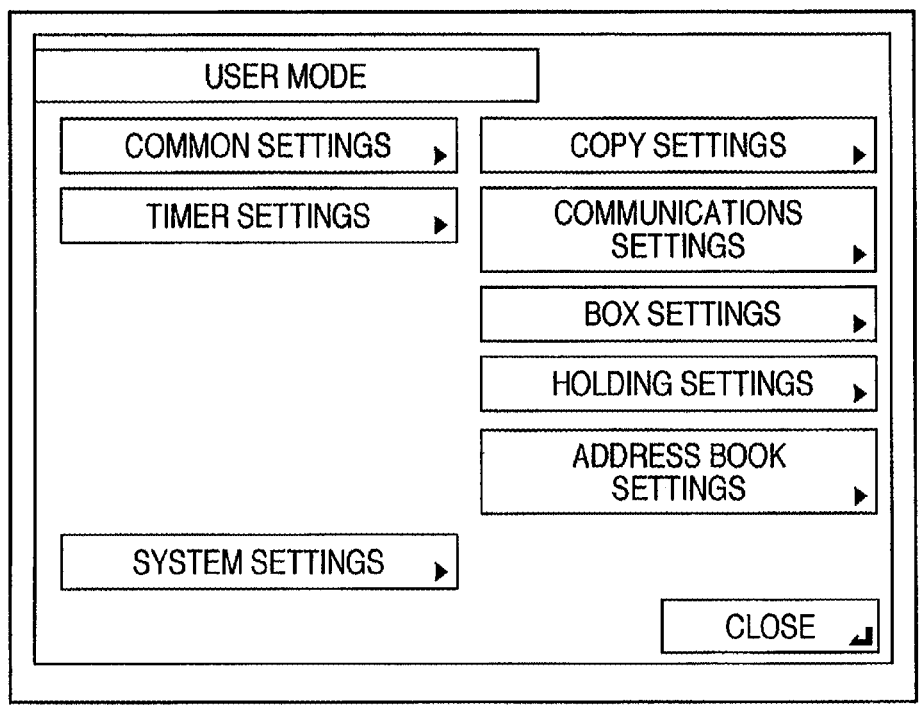
FIG. 20 is a view showing a user mode window according to the embodiment.

FIG. 20 shows a user mode window which is displayed on the LCD display unit when the user presses a user mode key of the operation unit 1008. Various settings of the entire system can be input here. A "common settings" button sets common settings related to various functions of the system. When the user presses the "common settings" button, a window for various settings is displayed, including setting of a default selection tab. In this embodiment, one of four function selection tabs "copy", "send", "box", and "hold" is set as the default selection tab. The set contents are stored in a nonvolatile storage device such as a hard disk. When a preset time has elapsed, the MFP controller 1000 activates the tab selected as the default selection tab even if another tab is activated immediately before. The user can also set the name (title) of each tab and the display order by pressing the "common settings" button.

A "timer settings" button executes settings related to a process that the system performs every predetermined time. A "copy settings" button sets the copy function. A "communications settings" button sets transmission and reception. A "mail box settings" button sets the BOX function (including password setting). A "holding settings" button sets the holding function. An "address book settings" button executes settings related to an address book to be used in executing a transmission job. A "system settings" button is used by the administrator of the MFP controller 1000 for settings. The user mode window can be closed by pressing a "close" button.

Figure 21:
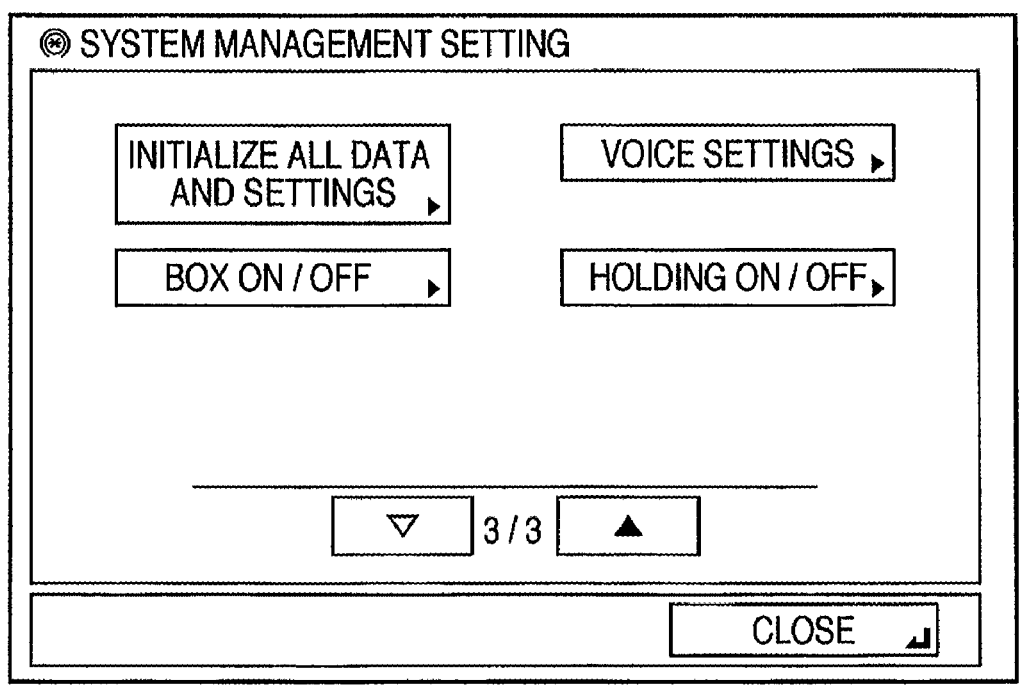
FIG. 21 is a view showing a system management setting window according to the embodiment.

FIG. 21 shows a window which is displayed on the display unit when the user presses the "system settings" in the user mode window shown in FIG. 33. A "close" button to close the setting window, the current page (FIG. 21 shows the third page of three pages), and page move buttons are arranged on the lower side of the window. A button to initialize all data and settings, a button to enable or disable a voice output function, and buttons to enable or disable the BOX and holding functions are arranged on the upper side of the window.

Figure 22:
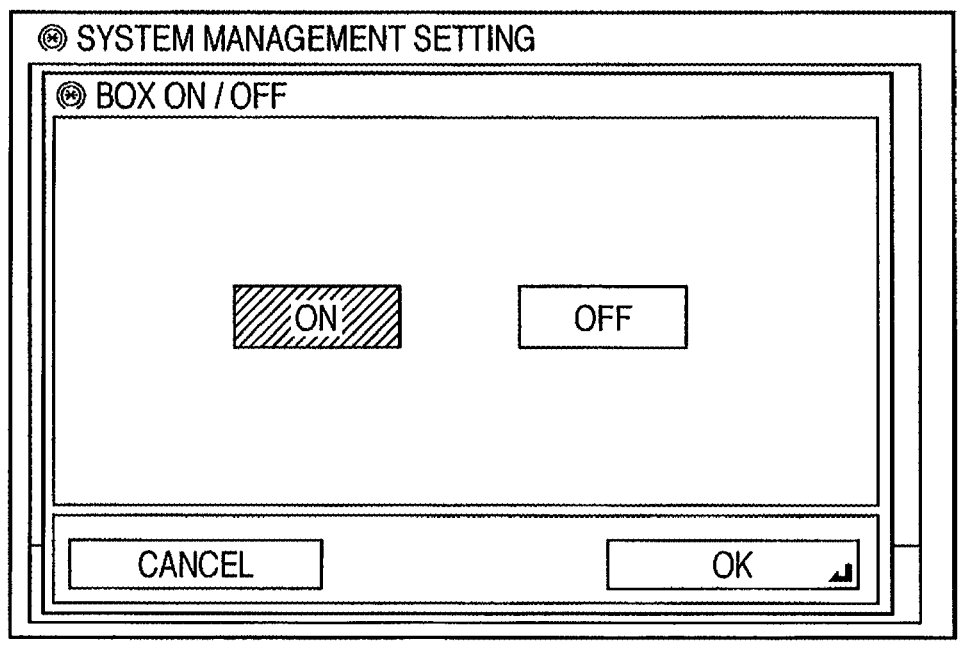
FIG. 22 is a view showing a BOX ON/OFF setting window according to the embodiment.

FIG. 22 shows a window of the display unit when the user presses the "BOX ON/OFF" button in the system management setting window shown in FIG. 21. The current setting is highlighted. FIG. 22 indicates that "ON" is selected. The user can select "OFF" by pressing an "OFF" button and then an "OK" button in this window. When "OFF" is selected, the box tab and the window displayed when the box tab is selected disappear from the top window of the touch panel portion so the user cannot use the BOX function. When "OFF" is selected, and a box job is received in this state, the MFP controller 1000 cancels (discards) the job.

Figure 23:
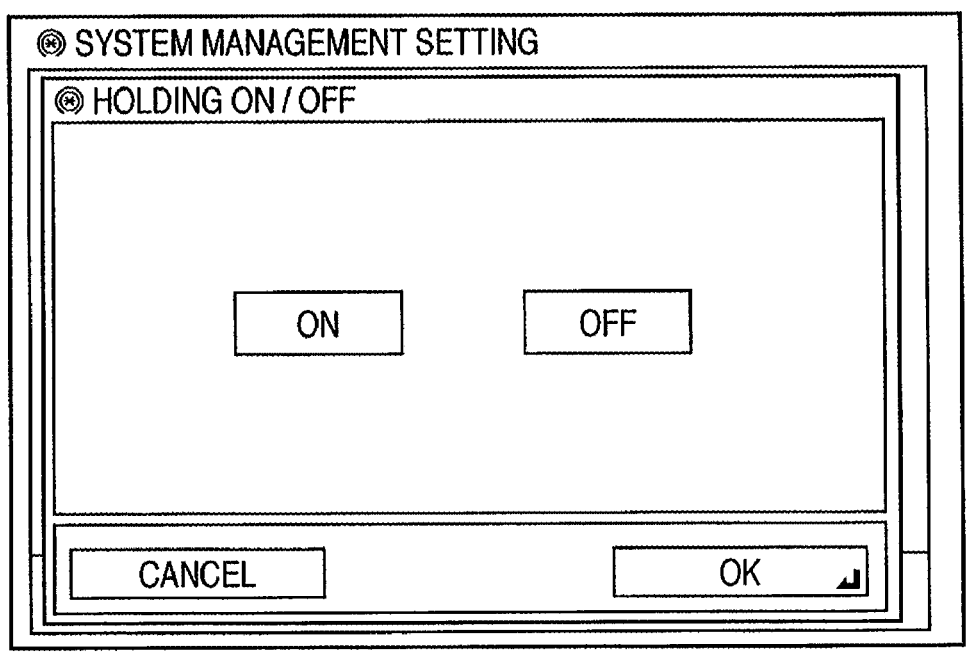
FIG. 23 is a view showing a hold ON/OFF setting window according to the embodiment.
Figure 24:
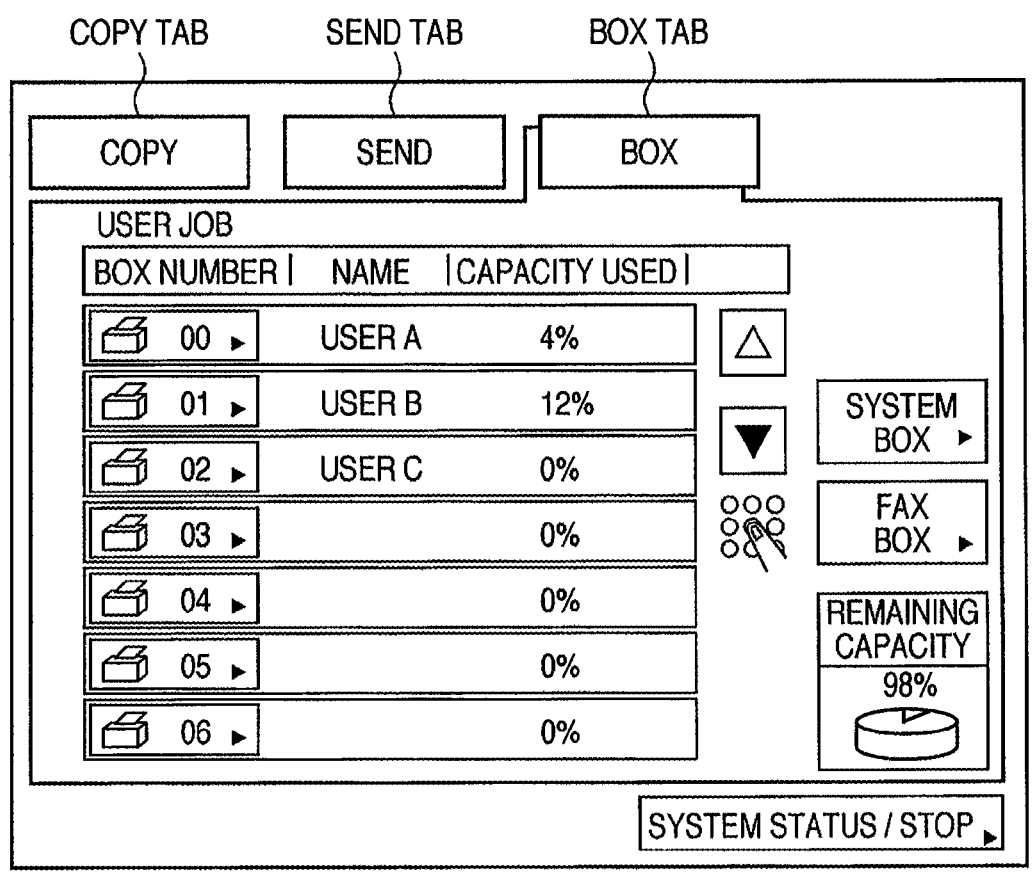
FIG. 24 is a view showing a display example of the display unit in the OFF state of the holding function according to the embodiment.
Figure 25:
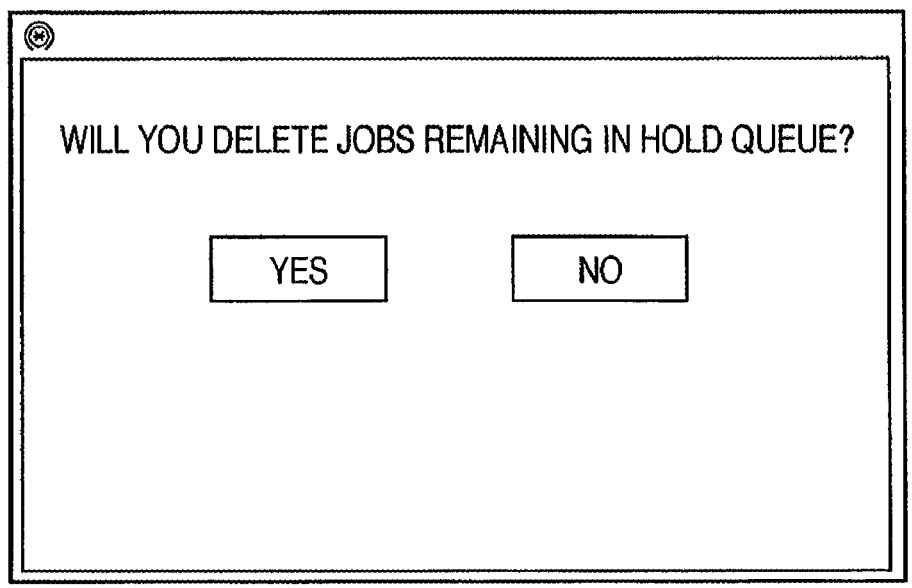
FIG. 25 is a view showing a hold queue delete section window according to the embodiment.

FIG. 23 shows a window of the display unit when the user presses the "holding ON/OFF" button in the system management setting window shown in FIG. 21. The window is the same as in BOX ON/OFF setting, and a description thereof will not be repeated. When "OFF" is selected, the hold tab and the window displayed when the hold tab is selected disappear from the top window of the touch panel portion, and a window shown in FIG. 24 is displayed so the user cannot use the holding function. When a hold job is received in this state, the MFP controller 1000 cancels (discards) the job. If a job exists in the hold queue, a window shown in FIG. 25 is displayed to cause the user to select whether to delete the job.

The display unit has mainly been described above. The process sequence will mainly be described below.

Figure 26:
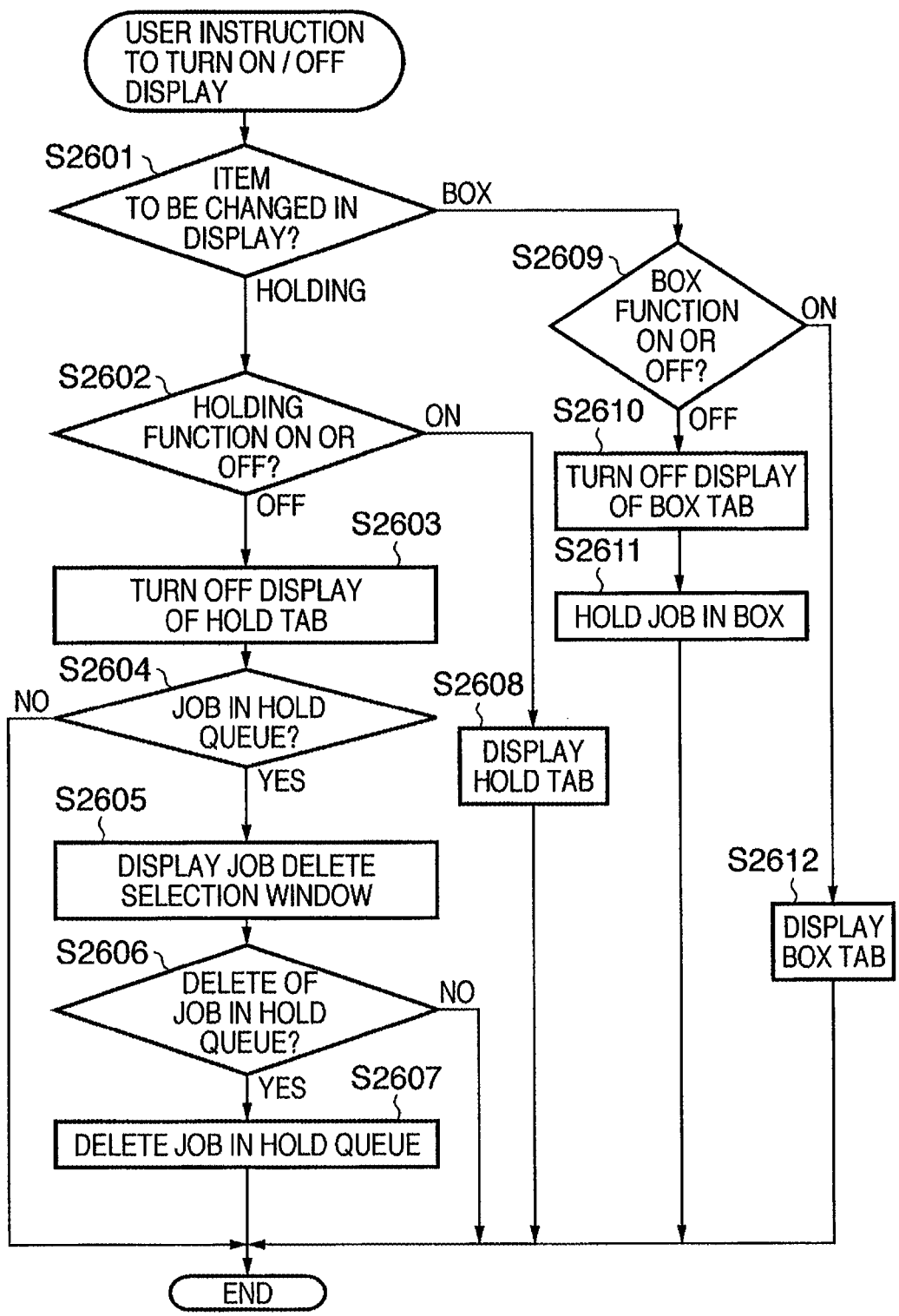
FIG. 26 is a flowchart illustrating a display switching process according to the embodiment.

FIG. 26 is a flowchart illustrating the process sequence of the MFP controller 1000 when the BOX function or holding function is ON/OFF-controlled in FIG. 22 or 23. In step S2601, which function, BOX function or holding function, should be changed in ON/OFF setting is determined.

For the BOX function, the process advances to step S2609 to display the BOX function ON/OFF selection window and determine an instruction input from the operator. Upon detecting an instruction input to select "ON", the process advances to step S2612 to enable display of the tab for the BOX function on the display unit. For "OFF", display of the box tab is disabled (step S2610). This inhibits the user from using the BOX function. However, jobs in the boxes are often reused and therefore held in the storage device (in this embodiment, hard disk) (step S2611).

For the holding function, the process advances to step S2602 to display the holding function ON/OFF selection window and determine an instruction input from the operator. Upon detecting an instruction input to select "ON", the process advances to step S2608 to enable display of the tab for the holding function on the display unit, as shown in FIG. 8A. If the instruction input indicates "OFF", the process advances to step S2603 to disable display of the hold tab not to display the hold tab shown in FIG. 24. This inhibits the user from using the holding function. In step S2604, it is determined whether a job exists in the hold queue. If at least one job exists in the hold queue, the process advances to step S2605. The holding function is often used to temporarily save a job in the storage device. Hence, when "OFF" is selected, a window is displayed to ask the user whether to delete jobs accumulated in the hold queue (step S2605). If the user selects delete, the jobs in the hold queue are deleted (steps S2606 and S2607).

The pieces of holding function and BOX function ON/OFF setting information of the operator are stored in a nonvolatile storage device such as a hard disk.

Figure 27:
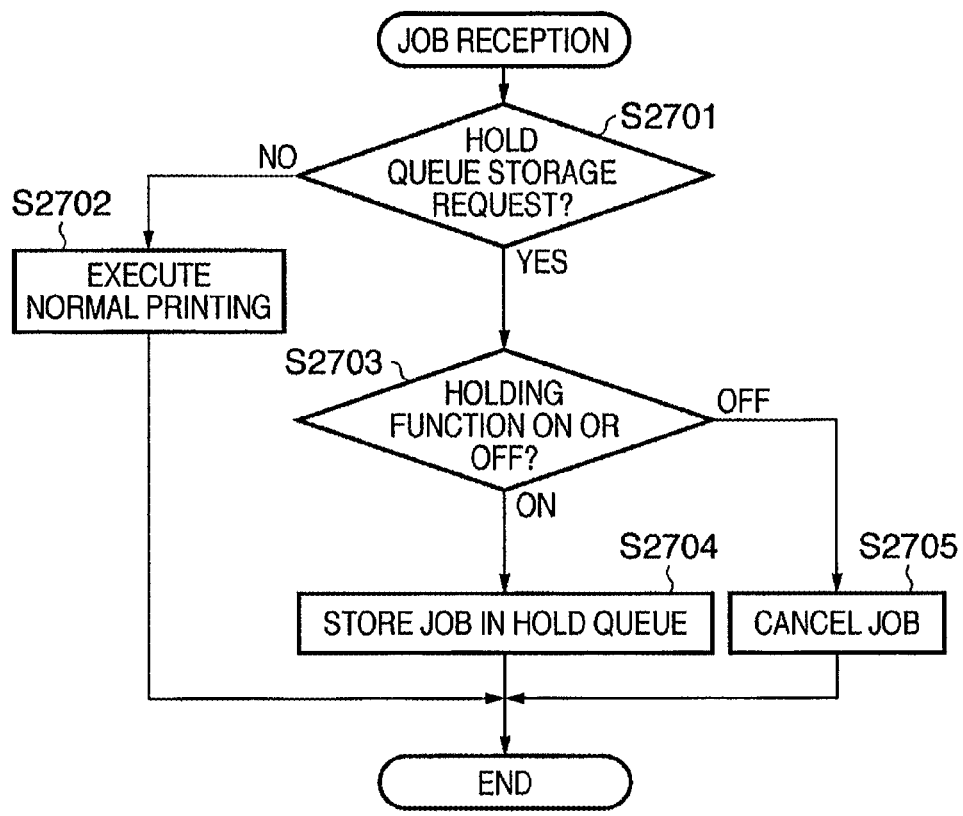
FIG. 27 is a flowchart illustrating a hold job reception process according to the embodiment.

FIG. 27 is a flowchart illustrating the process sequence when a job of the holding function is received. In step S2701, it is determined whether a hold queue storage request is received. If NO in step S2701, the job is not a job requiring the holding function, and the process advances to normal print processing (step S2702). If the job is a job that requires the holding function, the process advances to step S2703 to determine the operator setting in FIG. 23, ON or OFF. If "ON", the received job is stored in the hold queue in step S2704. If "OFF", the process advances to step S2705 to cancel the received job. The process for the holding function has been described above. This also applies to the BOX function.

As shown in FIG. 3, the MFP of this embodiment has the dedicated I/F 1004 to connect an external device. Various devices can be connected to this interface. A case in which a controller dedicated to PDL printing and having the holding function is connected to the dedicated I/F will be described below. In this case, the dedicated controller is inserted between the network and the MFP of this embodiment.

When the external controller having the above-described holding function is connected to the MFP 100 of this embodiment, the MFP controller 1000 of the embodiment automatically turns off the holding function. As a result, the hold tab is not displayed on the operation unit of the MFP, as shown in FIG. 24. For this purpose, pieces of information representing the types of controllers with the holding function are stored and held in advance in a storage device such as the hard disk of the MFP. When a device is connected to the dedicated I/F 1004, the MFP controller 1000 inquires about the type of the connected device, receives the answer, and determines whether the device matches one of the stored types. If information matching the device exists, the MFP controller 1000 determines that the connected device is an external controller having the holding function.

The administrator can add the type information of an external controller with the holding function to cope with appearance of a new external controller with the holding function. As the external controller, an information processing apparatus such as a general-purpose computer, or any other external device is applicable. However, a device corresponding to the external controller preferably has at least a function equivalent to the holding function of the embodiment and is adapted to execute data communication with the MFP 100 of the embodiment.

Figure 28:
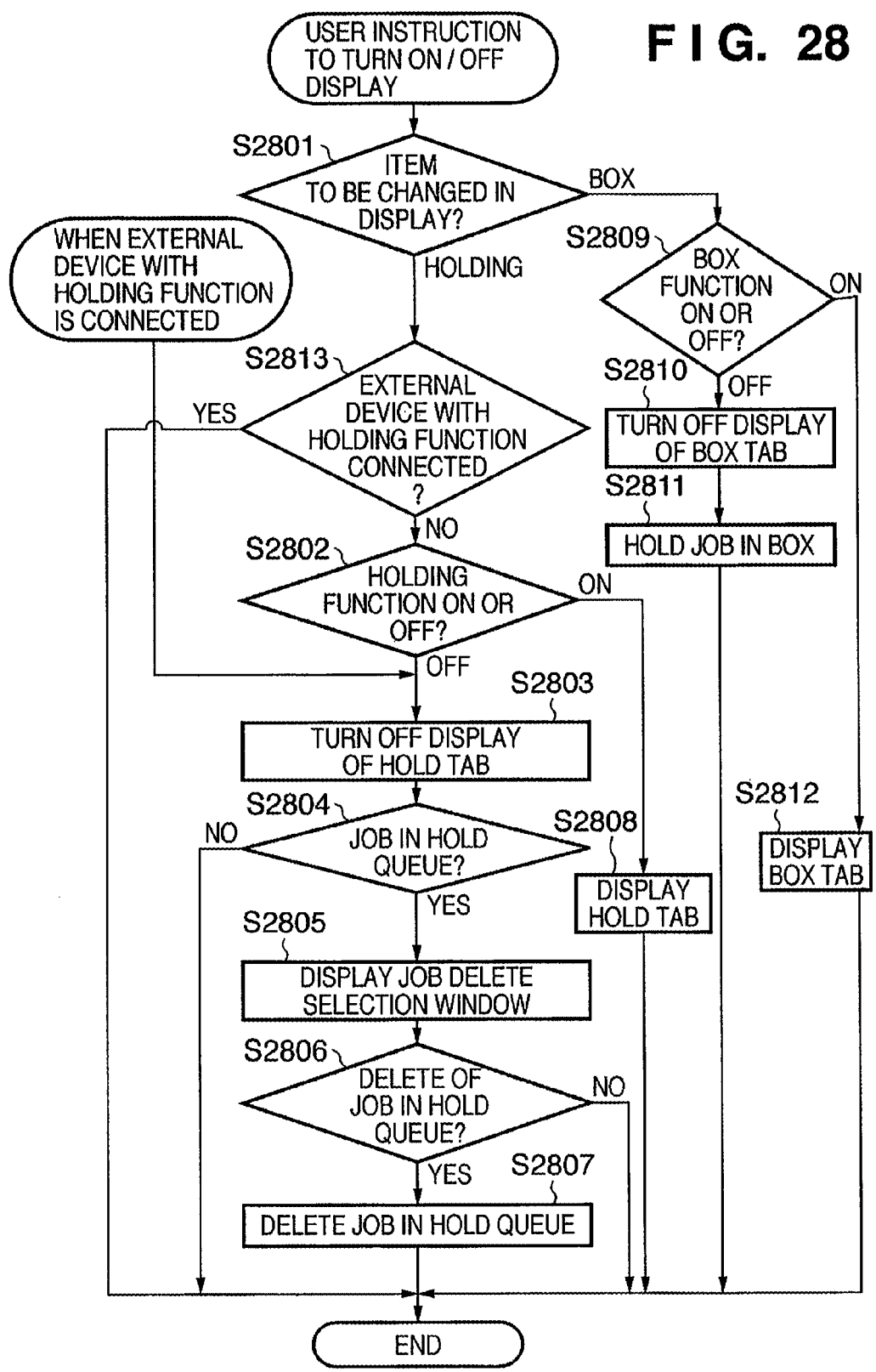
FIG. 28 is a flowchart illustrating a display switching process according to the embodiment.

FIG. 28 illustrates a process sequence when the external controller is connected. Unlike in FIG. 26, when an external controller with the holding function is connected, the process advances to step S2803 to perform the same process as in the case in which the user turns off the holding function by the system management settings (FIG. 23) in the user mode setting. Additionally, the holding function cannot be changed by the system management setting, unlike in FIG. 26 (step S2813). The process in steps S2801 to S2812 is the same as in FIG. 26, and a description thereof will not be repeated.

FIG. 29 is a flowchart illustrating a process sequence when an external controller is connected, and a job requiring the holding function is received. In step S2901, it is determined whether the received job requests holding. If the job is determined as a normal print job, print processing is executed in step S2902. If it is determined that a holding request job is received, the process advances to step S2903 to determine whether an external device is connected. When an external device is connected, the job is immediately canceled (step S2906). If it is determined that no external device is connected, the process advances to step S2904. Steps S2904 to S2906 are the same as steps S2703 to S2705 in FIG. 27, and a description thereof will not be repeated.

[Other Embodiments]

When the hold tab is pressed in the basic window of the embodiment, the window shown in FIG. 11 is displayed. When a desired job is selected from the hold job list, and a print instruction is input, the window changes to the active job list window in FIG. 12B. That is, the hold job list window and active job list window are independent of each other. An arrangement which allows the controller of the MFP of the embodiment or an external controller to executed the various kinds of display control has been disclosed in the above-described embodiment.

However, the present invention is not limited to this, and a window shown in FIG. 30 may be displayed. This display control may be done by the controller of the MFP of the embodiment or an external controller. This will be described below by using a detailed example.

In FIG. 30, the portion that displays jobs accumulated in the hold queue and the portion that displays jobs under print processing are included in one window, unlike in FIGS. 12A and 12B. List boxes on the upper side of the window indicate the list of jobs accumulated in the hold queue. When the user presses a "start print" button, a list box representing the list of jobs under print processing is displayed on the lower side of the window.

Buttons to manipulate the list of jobs accumulated in the hold queue will be described. The user can individually select jobs by pressing the touch panel. When a "display for only selecting user" button is pressed after selection, only the jobs of the user are displayed. When the "display for only selecting user" button is pressed again, the jobs of all users are displayed. A "select all" button selects all the displayed hold jobs. A "delete after print" button decides whether to delete a job after the end of printing. This button is switched on/off every time the user presses it. When a job is selected, and in this state, an "advanced settings/change" button is pressed, detailed information about the job is displayed, and a predetermined change operation can be done. Buttons to operate a print job will be described next. An "advanced settings/change" button is the same as in the hold job, and a description thereof will not be repeated. A "stop" button stops executing a job that is being printed or waiting for printing.

In the above-described embodiment, the holding function and BOX function are turned ON/OFF by displaying separate setting windows (FIGS. 22 and 23). The "copy" and "send" tabs are always displayed. For example, if the MFP of the embodiment rarely uses the FAX transmission or is not connected to a network, the menu window can be simplified by turning off the "send" tab.

Figure 31:
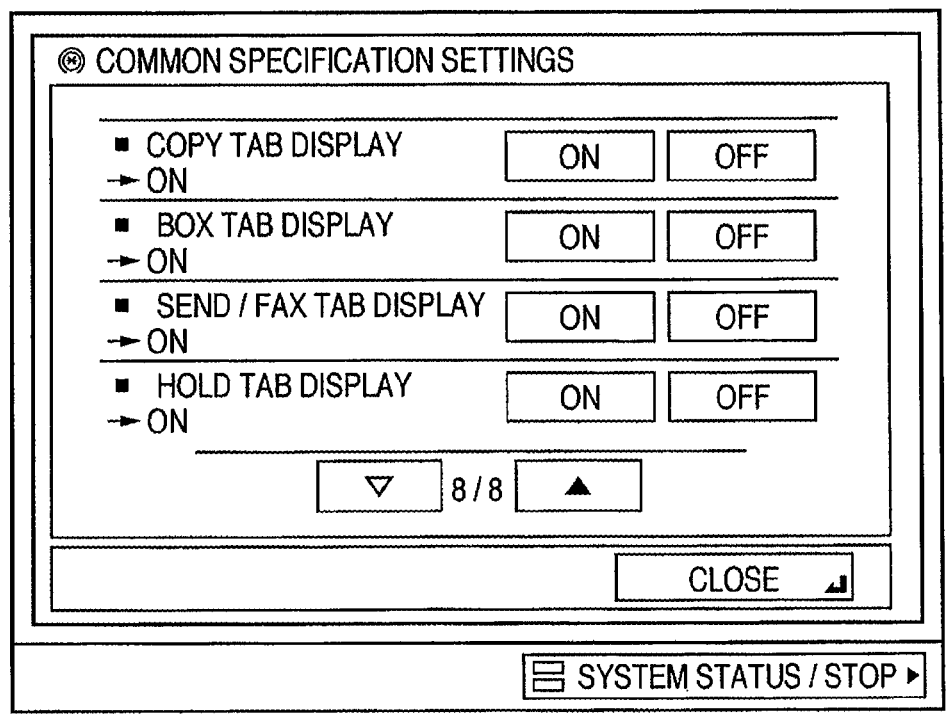
FIG. 31 is a view showing a user mode window according to another embodiment.

As shown in FIG. 31, ON/OFF setting for display of all displayable tabs (FIG. 31 indicates that four of a total of eight existing tabs are displayed) may be enabled. To display the window in FIG. 31, a "tab setting" button is provided in, for example, the window in FIG. 20 so that the window is displayed by pressing the "tab setting" button. The button to display the window in FIG. 31 may be provided in the window of the lower layer of the "common settings" button.

Figure 32:
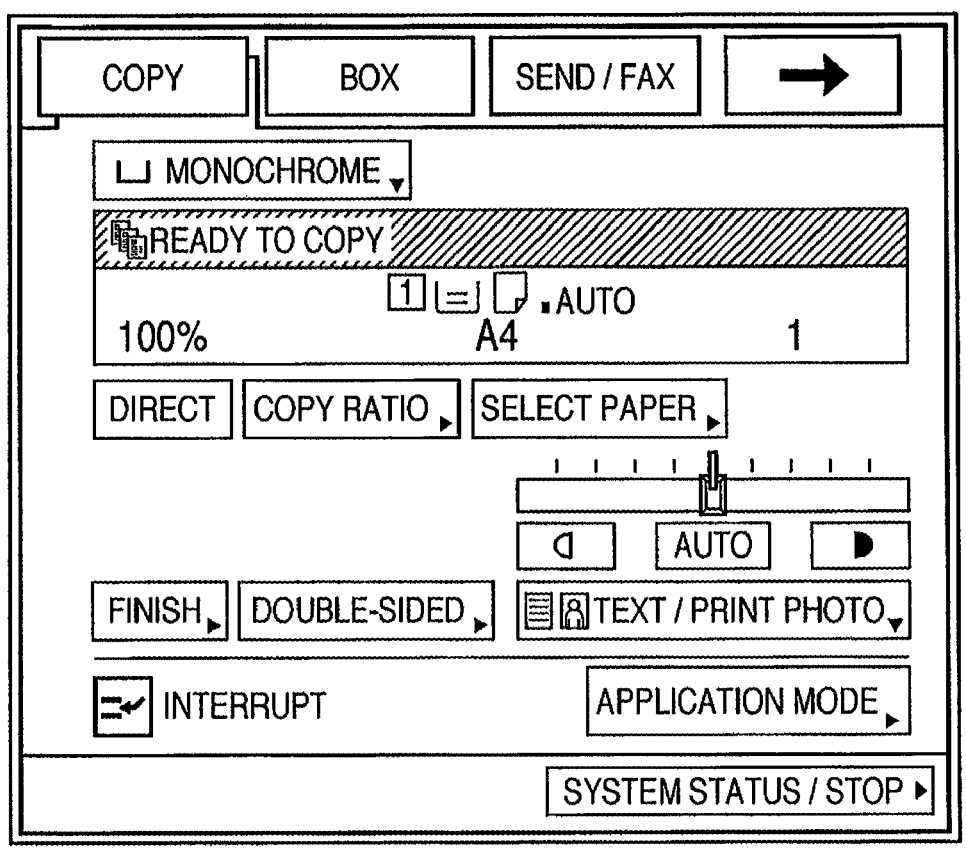
FIG. 32 is a view showing the screen of the display unit in the OFF state of the holding function according to another embodiment.

When the "copy", "box", "send/FAX" tabs are set to ON, the "hold" tab is set to OFF, and a "close" button is pressed, the display returns to the tab selection window in the initial state. At this time, if "copy" is set as the default selection tab, the window in FIG. 31 changes to the window in FIG. 32. As shown in FIG. 32, the display of the "hold" tab is turned off, and the "copy" tab set as the default selection tab is activated and displayed.

Still another embodiment will be described next.

A host computer capable of data communication with the above-described MFP 100 externally downloads program data having functions corresponding to the constituent elements disclosed in the embodiments via a predetermined communication medium such as the Internet and installs the program. The CPU of the host computer executes the program to make the various functions disclosed in the embodiments executable. The present invention is also applicable to this arrangement. In this case, data to display the same operation windows as those described in the embodiments is externally installed to provide the above-described various kinds of user interface windows on the display unit of the host computer. In this arrangement, the present invention is applicable even when an information group including a program is supplied, to an output device, from a storage medium such as a CD-ROM, flash memory, or FD or from an external storage medium via a network.

As described above, the object of the present invention can also be achieved by supplying a storage medium which records software program codes for implementing the functions of the above-described embodiments to a system or apparatus and causing the computer (or CPU or MPU) of the system or apparatus to read out and execute the program codes stored in the storage medium.

In this case, the program codes read out from the storage medium implement the new functions of the present invention by themselves, and the storage medium which stores the program codes constitutes the present invention.

The program can take any form such as an object code, a program to be executed by an interpreter, or script data to be supplied to the OS as long as the functions of the program can be obtained.

Examples of the storage medium to supply the program are a flexible disk, hard disk, optical disk, magnetooptical disk, MO, CD-ROM, CD-R, CD-RW, magnetic tape, nonvolatile memory card, ROM, and DVD.

In this case, the program codes read out from the storage medium implement the functions of the above-described embodiments by themselves, and the storage medium which stores the program codes constitutes the present invention.

The following program supply method is available. A client computer may be connect to a homepage on the Internet via a browser to download the computer program itself of the present invention or a compressed file containing an automatic installation function from the homepage to a recording medium such as a hard disk. The program codes contained in the program of the present invention may be divided into a plurality of files so that the user can download the files from different homepages. That is, a WWW server or ftp server which causes a plurality of users to download the program file to implement the functional processing of the present invention is also incorporated in the claims of the present invention.

The program of the present invention may be encrypted, stored in a storage medium such as a CD-ROM, and distributed to users. Any user who satisfies predetermined conditions can download key information to decrypt the program from a homepage via the Internet. The user can execute the encrypted program by using the key information and install the program in the computer.

The functions of the above-described embodiments are implemented not only when the computer executes the readout program codes but also when, e.g., the OS (Operating System) running on the computer partially or wholly executes actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit partially or wholly executes actual processing.

The present invention is applicable to a system including a plurality of devices or an apparatus including a single device. The present invention is adaptable even when it is achieved by supplying a program to the system or apparatus. In this case, the system or apparatus can enjoy the effects of the present invention by reading out the program expressed by software for achieving the present invention from the storage medium.

The present invention is not limited to the above-described embodiments, and various changes and modifications (including organic combinations of the embodiments) can be made based on the spirit of the present invention without departing from the scope of the present invention. For example, in the embodiments, the controller in the MFP principally executes various kinds of control. However, for example, the above-described external controller separated from the case of the printing apparatus may be able to partially or wholly execute the various kinds of control.

Various examples and embodiments of the present invention have been described above. For those skilled in the art, the spirit and scope of the present invention are not limited to the specific explanation in the specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-006423, filed Jan. 15, 2007, which is hereby incorporated by reference herein in its entirety.

What is claimed is:

1. A printing apparatus having a plurality of functions, said apparatus comprising:
    an input unit configured to input a job;
    a storage unit configured to store the job inputted by said input unit;
    a designation unit configured to designate, in accordance with a user's instruction, one of the plurality of functions;
    a display unit configured to, if said designation unit designates a first function, display a plurality of jobs associated with the first function among jobs stored in said storage unit;
    a selection unit configured to, in accordance with a user's instruction, select one of the plurality of job displayed by said display unit;
    an execution unit configured to execute the job selected by said selection unit;
    a determination unit configured to, in accordance with a user's instruction, determine to inhibit the first function;
    an inhibition unit configured to, if said determination unit determines to inhibit the first function, inhibit the first function;
    an inquiry unit configured to, if said determination unit determines to inhibit the first function, automatically inquire of a user whether to delete jobs associated with the first function; and
    a deletion unit configured to, if the user reply to the inquiry by the inquire unit to delete jobs associated with the first function, delete jobs associated with the first function among jobs stored in said storage unit.

2. The apparatus according to claim 1, wherein, in a case where said designation unit designates the first function, said deletion unit deletes the jobs from said storage unit after said execution unit executes the job selected by said selection unit.

3. The apparatus according to claim 2, wherein the first function is a holding function.

4. The apparatus according to claim 1, wherein said designation unit can designate a second function in accordance with a user's instruction,
    wherein said display unit displays a plurality of jobs associated with the second function among jobs stored in said storage unit if said designation unit designates the second function,
    wherein said inhibition unit can inhibit the designation of the second function by said designation unit, in accordance with a user's instruction, and
    wherein said deletion unit does not delete jobs associated with the second function among jobs stored in said storage unit if said inhibition unit inhibits the designation of the second function by said designation unit.

5. The apparatus according to claim 4, wherein, in a case where said designation unit designates the second function, said deletion unit does not delete the jobs from said storage unit after said execution unit executes the job selected by said selection unit.

6. The apparatus according to claim 5, wherein the second function is a BOX function.

7. A method of controlling a printing apparatus having a plurality of functions, said method comprising:
    inputting a job;
    storing the job inputted in the input step into a storage unit;
    designating, in accordance with a user's instruction, one of the plurality of functions;
    displaying a plurality of jobs associated with a first function among jobs stored in the storage unit if the first function is designated in the designating step;
    selecting, in accordance with a user's instruction, one of the plurality of jobs displayed in the displaying step;
    executing the job selected in the selecting step;
    determining, in accordance with a user's instruction, to inhibit the first function;
    inhibiting the first function if the inhibition of the first function is determined in the determining step;
    inquiring automatically of the user whether to delete jobs associated with the first function if the inhibition of the first function is determined in the determining step;
    deleting jobs associated with the first function among jobs stored in the storage unit if the user reply to the inquiry in the inquiring step to delete jobs associated with the first function.

8. A non-transitory computer-readable storage medium storing a computer-executable program that, when executed by a computer, causes the computer to perform a method of controlling a print apparatus having a plurality of functions, the method comprising:
    inputting a job;
    storing the job inputted in the input step into a storage unit;
    designating, in accordance with a user's instruction, one of the plurality of functions;
    displaying a plurality of jobs associated with a first function among jobs stored in the storage unit if the first function is designated in the designating step;
    selecting, in accordance with a user's instruction, one of the plurality of jobs displayed in the displaying step;
    executing the job selected in the selecting step;
    determining, in accordance with a user's instruction, to inhibit the first function;
    inhibiting the first function if the inhibition of the first function is determined in the determining step;
    inquiring automatically of the user whether to delete jobs associated with the first function if the inhibition of the first function is determined in the determining step;
    deleting jobs associated with the first function among jobs stored in the storage unit if the user reply to the inquiry in the inquiring step to delete jobs associated with the first function.

* * * * *